(12) United States Patent
Landolt et al.

(10) Patent No.: US 12,129,063 B2
(45) Date of Patent: Oct. 29, 2024

(54) PACKAGING APPARATUS AND PROCESS

(71) Applicant: Cryovac, LLC, Charlotte, NC (US)

(72) Inventors: Stefan Landolt, Obernau (CH); Peter Schnurrenberger, Steinhausen (CH); Peter Müller, Goldau (CH)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 17/768,519

(22) PCT Filed: Oct. 14, 2020

(86) PCT No.: PCT/EP2020/078851
§ 371 (c)(1),
(2) Date: Apr. 13, 2022

(87) PCT Pub. No.: WO2021/074194
PCT Pub. Date: Apr. 22, 2021

(65) Prior Publication Data
US 2024/0109678 A1   Apr. 4, 2024

(30) Foreign Application Priority Data

Oct. 14, 2019   (EP) .................................... 19203091

(51) Int. Cl.
*B65B 31/04*   (2006.01)
*B65B 7/02*   (2006.01)
(Continued)

(52) U.S. Cl.
CPC ................ *B65B 51/18* (2013.01); *B65B 7/02* (2013.01); *B65B 31/048* (2013.01); *B65B 51/30* (2013.01);
(Continued)

(58) Field of Classification Search
CPC ....... B65B 51/18; B65B 31/048; B65B 51/30; B65B 51/32; B65B 2051/105
See application file for complete search history.

(56) References Cited

U.S. PATENT DOCUMENTS 3,269,236 A * 8/1966 Johnson ................... B65B 65/02
83/112
4,219,988 A * 9/1980 Shanklin ............. B29C 66/4322
53/374.6
(Continued)

FOREIGN PATENT DOCUMENTS

EP    1658956 A2    5/2006
GB     989369 A     4/1965
(Continued)

*Primary Examiner* — Lucas E. A. Palmer
(74) *Attorney, Agent, or Firm* — Jason R. Womer

(57) ABSTRACT

A packaging apparatus (1) for heat sealing packages (P) comprising a vacuum chamber (4) having an elongated opening (5) extending along or parallel to a longitudinal axis (L) of the vacuum chamber (4) and a conveyor (8) configured for receiving semi-sealed packages (P) and for moving the semi-sealed packages (P) relative to the vacuum chamber (4) along a main movement direction (M) such that each semi-sealed package (P) positioned on the conveyor (8) may have, during the relative movement of the semi-sealed package (P) with respect to the vacuum chamber (4), a terminal portion (TP) passing through the elongated opening (5) with its opening relatively moving within the vacuum chamber (4), while the main portion (MP) relatively moves outside the vacuum chamber (4). The packaging apparatus (1) further comprises evacuation means (9) fluidly communicating with the vacuum chamber (4) for evacuating gas present in the semi-sealed packages (P) and forming evacuated semi-sealed packages (P). The packaging apparatus (1) further comprises a heat sealer (13) configured for heat sealing the terminal portion (TP) of each evacuated semi-
(Continued)

sealed package (P) thereby forming heat sealed packages (P). The packaging apparatus (1) is provided with at least one pre-heating unit (39, 40) arranged along the main movement direction (M) upstream of the heat sealing station (14) for pre-heating at least a band of the terminal portion (TP) of each evacuated semi-sealed package (P). A packaging process is also disclosed. The packaging process may use the packaging apparatus (1).

14 Claims, 6 Drawing Sheets

(51) Int. Cl.
    *B65B 51/10*     (2006.01)
    *B65B 51/18*     (2006.01)
    *B65B 51/30*     (2006.01)
    *B65B 51/32*     (2006.01)

(52) U.S. Cl.
    CPC ........ *B65B 51/32* (2013.01); *B65B 2051/105* (2013.01)

(56) References Cited

U.S. PATENT DOCUMENTS

| | | | | |
|---|---|---|---|---|
| 4,380,446 A * | 4/1983 | Dickson | .............. | B29C 66/3452 493/34 |
| 4,537,585 A * | 8/1985 | Norman | .................. | B65B 51/18 493/205 |
| 5,536,356 A * | 7/1996 | Stuerzel | .............. | B29C 66/1122 493/197 |
| 5,603,801 A * | 2/1997 | DeFriese | ............... | B29C 66/849 53/389.5 |
| 6,027,596 A * | 2/2000 | DeFriese | ............. | B29C 66/4322 156/251 |
| 6,526,728 B1 * | 3/2003 | Sorenson | ................ | B65B 51/18 53/550 |
| 6,854,245 B1 * | 2/2005 | Stoddard | ................. | B65B 51/00 53/136.5 |
| 7,281,362 B2 * | 10/2007 | James | .................. | B29C 65/7433 53/374.3 |
| 7,487,625 B2 * | 2/2009 | Natterer | .................... | B65B 9/04 53/433 |
| 7,637,299 B2 * | 12/2009 | King, Jr. | ........... | B29C 66/91431 156/251 |
| 7,685,795 B2 * | 3/2010 | King, Jr. | ................. | B29C 65/18 53/374.4 |
| 8,651,162 B2 * | 2/2014 | Christman | ............ | B29C 66/849 156/583.1 |
| 8,820,035 B2 * | 9/2014 | Christman | ............ | B29C 66/919 53/550 |
| 9,757,930 B2 * | 9/2017 | Stork | .................... | B29C 66/849 |
| 10,906,677 B2 | 2/2021 | Palumbo et al. | | |
| 11,084,611 B2 * | 8/2021 | Thürig | .................. | B65B 31/024 |
| 2002/0148569 A1 * | 10/2002 | Stork | ...................... | B65B 51/16 156/582 |
| 2002/0152722 A1 * | 10/2002 | Stoddard | ........... | B29C 66/43121 53/133.8 |
| 2003/0168444 A1 * | 9/2003 | Liakopoulos | ..... | B29C 66/83423 219/659 |
| 2006/0107622 A1 * | 5/2006 | James | ................... | B29C 66/836 53/374.5 |
| 2006/0231157 A1 * | 10/2006 | Marcus | ................. | B65B 31/041 141/85 |
| 2006/0283152 A1 * | 12/2006 | Kawakami | .............. | B65B 25/18 53/481 |
| 2007/0234683 A1 * | 10/2007 | Hatchell | ................ | B65B 31/00 53/512 |
| 2010/0018160 A1 * | 1/2010 | Fukeda | ................. | B65B 43/465 53/284.7 |
| 2012/0017453 A1 | 1/2012 | Ogihara et al. | | |
| 2012/0023873 A1 * | 2/2012 | Leidig | ................. | B65B 69/0008 414/754 |
| 2015/0203222 A1 * | 7/2015 | Zonato | .................. | B65B 31/042 53/455 |
| 2016/0288937 A1 * | 10/2016 | Grether | ................. | B65B 31/06 |
| 2018/0036990 A1 * | 2/2018 | Drysdale | ................. | B65B 51/22 |
| 2018/0319523 A1 * | 11/2018 | Palumbo | ................. | B65B 51/16 |
| 2019/0193881 A1 | 6/2019 | Pecherskiy et al. | | |
| 2023/0219707 A1 * | 7/2023 | Landolt | ............ | B29C 66/83423 53/387.3 |

FOREIGN PATENT DOCUMENTS

| | | |
|---|---|---|
| JP | S5340865 | 4/1978 |
| JP | 2005022700 | 1/2005 |
| JP | 2010023887 | 2/2010 |
| WO | 9410039 A1 | 5/1994 |
| WO | 2002053457 A1 | 7/2002 |
| WO | 2016071160 A1 | 5/2016 |
| WO | 2017081107 A1 | 5/2017 |
| WO | 2020094267 A1 | 5/2020 |

* cited by examiner

PACKAGING APPARATUS AND PROCESS

TECHNICAL FIELD

The present invention relates to a packaging apparatus and to a packaging process particularly suitable for evacuating gas from bag shaped packages with at least one opening and for sealing the packages once sufficient gas evacuation has taken place. The present invention may also apply to solutions where a controlled atmosphere is created inside the package before final sealing of the same.

BACKGROUND ART

Packaging apparatus and processes can be used to package articles such as food products or products of other nature. The product can be a bare product or a product pre-loaded onto a tray.

Various alternative apparatuses and processes are known in the art. For example, a tube of plastic film can be continuously fed through a bag/package forming apparatus. The tube of plastic film is created around the product for example by joining together and sealing opposite longitudinal edges of the film. Alternatively, the product is placed in the tube of plastic film. A leading edge (at the downstream end) of the packaging material is sealed to form a semi-sealed package, vacuum is formed and then the semi-sealed package is sealed at the trailing edge (at the upstream end) to form a sealed package which is severed from the continuously moving tube of packaging material.

In other embodiments, products are loaded into pre-formed bags, which are then supplied to an evacuation station and to a sealing station. Further, some embodiments can facilitate evacuation of multiple packages at the same time in the same process step. The latter can be realized, for example, by processing multiple bags using a single vacuum system. A sealing unit comprising sealing bars or sealing rolls can be used to create seals in the packaging material. If sealing bars are employed, a lower bar and an upper bar are moved with respect to one another in order to contact each other while squeezing the packaging material between the bars and providing one or more seals, for example by heat sealing. Actuating sealing bars in this manner requires the sealing bars being stationary relative to the package, for example moving the sealing bars along with the package located on a conveyor or intermittently stopping the conveyor during the actuation of the sealing bars. Sealing rolls can be employed in order to maintain a continuous motion of packages on a conveyor belt. In some examples, packages are placed on a conveyor belt in an orientation where an unsealed end of the package, for example the open edge of a bag holding a product, is located laterally on the side of the conveyor with respect to a main movement direction of the conveyor. The open ends of the packages can then be fed through a sealing unit which performs, for example, heat sealing of the package material. The seal or seals are typically transversally extending regions, stripes, or bands of packaging material that have been processed (e.g. heat-treated) to provide a seal between the inside of the packaging and the environment.

A packaging apparatus is typically used for numerous different products with respect to, for example, the type of product, size, weight, and composition. Some packaging machines, such as those described in US2012/017453A1, employ a vacuum chamber designed to house one or more entire products to be evacuated. Generally, such a setup may entail several limitations. For example, the complexity and cost for the equipment leaves room for improvement due to the many components required. Further, the sizes of products that can be processed are limited by the maximum size of the vacuum chamber holding the product during evacuation. In some applications, it is difficult to provide chambers of sufficient size due to structural limitation of some components (e.g. actuators, supports). Also, maintaining process reliability and durability of components may be difficult with increasing size of components (e.g. chambers, actuators, gaskets) as the size typically impacts wear and tear properties. Additionally, processing times may increase due to vacuumization of larger chambers taking comparably longer time.

Besides the apparatus and process disclosed in US2012/017453A1, apparatus and processes using a vacuum chamber having an elongated opening such as the one disclosed in PCT/EP2017/079595 have been developed. In this latter apparatus, the semi-sealed packages and the vacuum chamber are moved relative with respect to one another such that a terminal portion of the open end of the semi-sealed packages relatively moves within the vacuum chamber, while the rest of the package remains outside the vacuum chamber. This apparatus, therefore, allows to process packages of various sizes, without the problem of changing the size of the vacuum chamber because only the terminal portion of the semi-sealed packages is housed inside the vacuum chamber during gas evacuation and sealing.

In the above described apparatus a critical phase is the sealing: in fact should sealing not be perfect, then the package would leak gas severely compromising the product durability (in case of perishable products), possibly causing product contamination and in in any case negatively impacting on package aesthetic appearance.

Although efforts have been made to improve quality of the sealing, the applicant has found that improvements are still possible.

An aim of the present invention is to provide a packaging apparatus and process that facilitate efficient packaging of products and improved sealing.

A further aim of the invention is to improve sealing without compromising durability, and in particular without causing wear, of the components of the sealing unit or of the packaging apparatus.

An additional aim is that of providing a packaging apparatus and process which is suitable for a wide variety of sizes of products.

A further aim of the present invention is to provide a packaging apparatus and process, which are relatively simple to implement and which do not require substantial changes in the process that facilitates evacuation of gas and/or air from a package in a continuous manner. In particular, it is an aim of the invention to provide a packaging apparatus capable of executing the packaging process of the invention.

SUMMARY OF INVENTION

At least one of the aims of the invention is substantially achieved by a packaging apparatus and by a packaging process according to any one of the appended claims.

Further aspects of the invention are described herein below.

A 1st aspect relates to a packaging apparatus comprising:
- a vacuum chamber,
- a conveyor configured for receiving semi-sealed packages, each one of the semi-sealed packages having a terminal portion with at least one opening, such as an open end, and a main portion housing one or more products, the conveyor being further configured for moving the semi-sealed packages relative to the vacuum chamber along a main movement direction such that each semi-sealed package positioned on the conveyor may have, during the relative movement of the semi-sealed package with respect to the vacuum chamber, at least the terminal portion arranged inside the vacuum chamber, evacuation means fluidly communicating with the vacuum chamber and configured for providing the vacuum chamber with an internal vacuum pressure that is lower than an ambient pressure outside the vacuum chamber thereby evacuating gas present in the semi-sealed packages and forming evacuated semi-sealed packages, a heat sealer arranged along the main movement direction and configured for receiving the evacuated semi-sealed packages, the heat sealer comprising a heat sealing station configured for heat sealing the terminal portion of each evacuated semi-sealed package thereby forming heat sealed packages, at least one pre-heating unit arranged along the main movement direction upstream of the heat sealing station and configured for pre-heating at least a band of the terminal portion of each evacuated semi-sealed package.

In a 2nd aspect according to the 1st aspect, the vacuum chamber has an elongated opening extending along or parallel to a longitudinal axis of the vacuum chamber, the conveyor being further configured for moving the semi-sealed packages relative to the vacuum chamber along a main movement direction such that each semi-sealed package positioned on the conveyor may have, during the relative movement of the semi-sealed package with respect to the vacuum chamber, the terminal portion passing through the elongated opening with its opening relatively moving within the vacuum chamber while the main portion relatively moves outside the vacuum chamber.

In a 3rd aspect according to the 1st or the 2nd aspect, the longitudinal axis of the vacuum chamber being approximately parallel to the main movement direction.

In a 4th aspect according to the 1st or the 2nd or the 3rd aspect, the heat sealer comprises a sealing belt configured for guiding the terminal portion of the evacuated semi-sealed packages along the main movement direction at least from the pre-heating unit to the heat sealing station, the pre-heating unit being configured for pre-heating at least a heat conveying tract of the sealing belt designed to come into contact with said band of the terminal portion of each evacuated semi-sealed package and pre-heat it.

In a 5th aspect according to the 4th aspect, the heat conveying tract of the sealing belt is configured for transferring heat to said band of the terminal portion of the evacuated semi-sealed package thereby pre-heating it.

In a 6th aspect according to the 4th or the 5th aspect, the sealing belt comprises, at least on a surface designed to come into contact with a heat sealing surface of the heat sealing station, non-stick material.

In a 7th aspect according to the 4th or the 5th or the 6th aspect, the sealing belt is configured for guiding the terminal portion of evacuated semi-sealed packages along the main movement direction at least at the heat sealing station while avoiding that said terminal portion sticks to the heat sealing station.

In a 8th aspect according to the 6th or the 7th aspect, the non-stick material is configured for avoiding the terminal portion of the evacuated semi-sealed packages to stick to the heat sealing surface of the heat sealing station while the heat sealing station heat seals the terminal portion of the evacuated semi-sealed packages.

In a 9th aspect according to any of the aspect from the 4th to the 8th, the sealing belt and the conveyor are synchronized with each other.

In a 10th aspect according to any of the aspect from the 4th to the 9th, the sealing belt has a non-stick material body reinforced with reinforcing material, optionally the reinforcing material comprising glass fiber.

In a 11th aspect according to the 10th aspect, the non-stick material body is at least partially in a polymer material, for example in polytetrafluoroethylene.

In a 12th aspect according to any of the aspect from the 4th to the 11th, the sealing belt is at least partially made in non-slippery material.

In a 13th aspect according to any of the aspect from the 4th to the 12th, the packaging apparatus comprises a control unit communicatively connected at least with conveyor, the conveyor having a conveying surface designed to receive the main portion of the semi-sealed packages, the control unit being configured for synchronizing the conveyor and the sealing belt to guide, by means of the sealing belt, the terminal portion at least from the pre-heating unit to the heat sealing station through the elongated opening with the opening relatively moving within the vacuum chamber while the conveyor relatively moves the main portion of the semi-sealed packages, which is in contact with the conveying surface, outside the vacuum chamber.

In a 14th aspect according to the 13th aspect, the control unit is configured for controlling the sealing belt and the conveyor to move at the same speed.

In a 15th aspect according to any of the aspect from the 1st to the 14th, the pre-heating unit comprises a pre-heating body arranged along the main movement direction and facing or being at least partially in contact with the sealing belt, the pre-heating body being configured for pre-heating said heat conveying tract of the sealing belt.

In a 16th aspect according to the 15th aspect, the heat sealer comprises at least one pulley configured for engaging the sealing belt, the pre-heating body being configured for heating the pulley, the pre-heating body being built-in in the pulley or being configured for conveying heat to the pulley.

In a 17th aspect according to any of the aspect from the 4th to the 16th, the heat sealer comprises a first pulley and a second pulley opposite to each other with respect to the heat sealing station, the first pulley being arranged upstream the heat sealing station with respect to the main movement direction and being configured for guiding the sealing belt towards the heat sealing station and the second pulley being configured for circulating back the sealing belt towards the first pulley.

In a 18th aspect according to the 17th aspect, the pre-heating body being arranged at or in proximity of the first pulley and being configured for pre-heating said heat conveying tract of the sealing belt in proximity of the first pulley.

In a 19th aspect according to any of the aspects from the 15th to the 18th, the pre-heating body has at least one housing and at least one heating cartridge arranged in the housing, the heating cartridge being configured for pre-heating said heat conveying tract of the sealing belt upstream of the heat sealing station.

In a 20th aspect according to the 17th or the 18th or the 19th aspect, one of the first pulley and the second pulley is a drive pulley and the other one of the first pulley and the second pulley is a driven pulley.

In a 21st aspect according to any of the aspect from the 17th to the 20th, the heat sealer comprises at least one driving belt engaging the first pulley and the second pulley and configured for driving the driven pulley.

In a 22nd aspect according to any of the aspect from the 17th to the 21st, the heat sealer comprises a first driving belt and a second driving belt, each of the first driving belt and the second driving belt engaging the first pulley and the second pulley and being configured for driving the driven pulley.

In a 23rd aspect according to any of the aspect from the 17th to the 22nd, each of the first pulley and the second pulley comprises a first annular groove and a second annular groove, each annular groove housing a respective driving belt, the annular grooves of each of the first pulley and the second pulley being axially distanced each other along a rotation axis of the respective pulley.

In a 24th aspect according to any of the aspect from the 17th to the 23rd, at least the first pulley, or both the first and the second pulley, is in a material having considerable heat transfer properties, such as metallic material, and is configured for transferring heat to at least a heat conveying tract of the sealing belt so as to pre-heat it.

In a 25th aspect according to the 22nd or the 23rd or the 24th aspect, the sealing belt is interposed between the first driving belt and the second driving belt with respect to a direction which is transversal to the main movement direction.

In a 26th aspect according to any of the aspects from the 1st to the 25th, the pre-heating body has a first heating cartridge and a second heating cartridge arranged side by side.

In a 27th aspect according to the 26th aspect, the first heating cartridge and the second heating cartridge of the pre-heating body share the same housing or are arranged in a respective first housing and in a respective second housing of the pre-heating body.

In a 28th aspect according to any of the aspects from the 15th to the 27th, the pre-heating body has an overall "C-shape" and is arranged so as to enclose a drive or driven shaft of the pulley.

In a 29th aspect according to any of the aspects from the 15th to the 28th, the pre-heating body comprises a first arm, a second arm and a joining portion transversal to the first arm and the second arm, the joining portion being arranged between, and joining, the first arm and the second arm, said housing and said heating cartridge being located at one of the first arm and/or the second arm.

In a 30th aspect according to the 29th aspect, the sealing belt faces or is in contact with the pre-heating body at least at a portion of an outer surface of the pre-heating body defined at the first and/or second arm comprising said housing and said heating cartridge.

In a 31st aspect according to the 29th or the 30th aspect, the sealing belt envelops the pre-heating body and facing or being in contact with the pre-heating body at portions of an outer surface of the pre-heating body defined both at the first arm and at the second arm.

In a 32nd aspect according to the 29th or the 30th or the 31st aspect, the joining portion has a concave portion shaped as an arc of a circle, the concave portion receiving at least part of a drive pulley of the sealing belt.

In a 33rd aspect according to any of the aspect from the 29th to the 32nd, the first arm and the second arm are approximately parallel to each other and are configured for being at least partially in contact with respective tracts of the sealing belt.

In a 34th aspect according to any of the aspect from the 1st to the 33rd, the pre-heating unit is configured for pre-heating said band of the terminal portion of each evacuated semi-sealed package at a pre-heating temperature which is lower than a heat sealing temperature at which the heat sealing station is configured for heating the terminal portion of each evacuated semi-sealed package.

In a 35th aspect according to any of the aspect from the 1st to the 34th, the packaging apparatus comprises a control unit communicatively connected at least with the pre-heating unit, with the conveyor and with the heat sealing station, the control unit being configured for implementing a sealing procedure comprising:
  setting or allowing setting the pre-heating temperature and the heat sealing temperature,
  controlling the conveyor to guide at least the terminal portion of the semi-sealed packages, e.g. through the elongated opening of the vacuum chamber along or parallel to the longitudinal axis of the vacuum chamber,
  controlling the pre-heating unit based on said pre-heating temperature to pre-heat at least said band of the terminal portion of each semi-sealed package while the conveyor moves the terminal portion of each semi-sealed package along or parallel to the longitudinal axis of the vacuum chamber,
  controlling the heat sealing station based on said heat sealing temperature to heat seal the terminal portion of each evacuated semi-sealed package thereby forming heat sealed packages while the conveyor moves the terminal portion of the evacuated semi-sealed packages along or parallel to the longitudinal axis of the vacuum chamber.

In a 36th aspect according to the 35th aspect, the control unit is communicatively connected also with the sealing belt and being configured for controlling the sealing belt in synchrony with the conveyor.

In a 37th aspect according to any of the aspects from the 1st to the 36th, the heat sealing station comprises at least one heat sealing body.

In a 38th aspect according to the 37th aspect, the heat sealing body comprises a heat sealing head configured for contacting and for heat sealing the terminal portion of the evacuated semi-sealed packages, the control unit being communicatively connected to the heat sealing station and being further configured for:
  moving the heat sealing body towards the terminal portion of the evacuated semi-sealed packages,
  controlling the heat sealing body to contact, by means of the heat sealing head, the sealing belt arranged above the terminal portion of the evacuated semi-sealed packages to be heat sealed.

In a 39th aspect according to any of the aspects from the 35th to the 38th, the control unit is configured for, during pre-heating at least said band of the terminal portion of each semi-sealed package at the pre-heating temperature, reaching the softening point of the material of the semi-sealed packages.

In a 40th aspect according to the 38th or the 39th aspect, the control unit is configured for, during heat sealing at least said band of the terminal portion of each evacuated semi-sealed package at the heat sealing temperature, reaching the melting point of the material of the evacuated semi-sealed packages.

In a 41st aspect according to any of the aspects from the 35th to the 40th, the control unit is configured for:
  setting absolute values of a minimum pre-heating temperature and a maximum pre-heating temperature, e.g. respectively 100° C. and 140° C., thereby defining a pre-heating temperature range, e.g. ranging from 100° C. to 140° C.,
  setting absolute values of a minimum heat sealing temperature and a maximum heat sealing temperature, e.g. respectively 160° C. and 240° C., thereby defining a heat sealing temperature range, e.g. ranging from 160° C. to 240° C.,
  as a function of the material of the semi-sealed packages to be heat sealed.

In a 42nd aspect according to any of the aspects from the 35th to the 41st, the control unit is configured for setting the pre-heating temperature as a function of at least one of:
  an internal vacuum pressure defined in at least a portion of the vacuum chamber,
  a temperature of the terminal portion of the evacuated semi-sealed packages located upstream or at the pre-heating unit,
  a residual target pressure of the evacuated semi-sealed packages or of the heat sealed packages,
  the material of the semi-sealed packages to be heat sealed,
  at least one dimension of the semi-sealed package, such as the thickness of the material of the semi-sealed package at the terminal portion of the semi-sealed package, or of at least one dimension of the one or more products housed inside the semi-sealed packages.

In a 43rd aspect according to any of the aspects from the 35th to the 42nd, the control unit is configured for setting the pre-heating temperature as a function of the internal vacuum pressure defined at a portion of the vacuum chamber defined at or upstream the pre-heating unit.

In a 44th aspect according to any of the aspects from the 35th to the 43rd, the control unit is configured for controlling the pre-heating unit to pre-heat continuously the sealing belt.

In a 45th aspect according to any of the aspects from the 35th to the 44th, the control unit is configured for controlling the pre-heating unit to pre-heat at least said heat conveying tract of the sealing belt as a function of a speed of the sealing belt or as a function of a conveying speed of the conveyor.

In a 46th aspect according to any of the aspects from the 35th to the 45th, the control unit is further configured for setting a heat sealing temperature as a function of the material of the semi-sealed packages to be heat sealed.

In a 47th aspect according to any of the aspects from the 35th to the 46th, the packaging apparatus or the pre-heating unit comprises a pre-heating temperature sensor, the control unit being communicatively connected with the pre-heating temperature sensor and being configured for implementing a pre-heating temperature monitoring procedure comprising:
  detecting an actual temperature of the pre-heating unit or of the sealing belt by means of the pre-heating temperature sensor,
  comparing the detected actual temperature with the pre-heating temperature and determining a deviation between the detected actual temperature and the pre-heating temperature,
  in case the deviation is greater than a prefixed threshold, controlling the pre-heating unit to reduce said deviation.

In a 48th aspect according to the 47th aspect, the pre-heating temperature monitoring procedure further comprises:
  in case the actual temperature detected is higher than the pre-heating temperature, de-energize, e.g. temporarily de-energize, at least one heating cartridge of the pre-heating unit so as to make the actual temperature decrease,
  in case the actual temperature detected is lower than the pre-heating temperature, energize, e.g. temporarily energize, at least one heating cartridge of the pre-heating unit so as to make the actual temperature increase.

In a 49 h aspect according to any of the aspects from the 35th to the 48th, the packaging apparatus or the heat sealing station comprises a heat sealing temperature sensor, the control unit being communicatively connected with the heat sealing temperature sensor and being configured for implementing a heat sealing temperature monitoring procedure comprising:
  detecting an actual temperature of the heat sealing or of the sealing belt by means of the heat sealing temperature sensor,
  comparing the detected actual temperature with the heat sealing temperature and determining a deviation between the detected actual temperature and the het sealing temperature,
  in case the deviation is greater than a prefixed threshold, controlling the heat sealing station to reduce said deviation.

In a 50th aspect according to any of the aspects from the 35th to the 49th, the heat sealing temperature monitoring procedure further comprises:
  in case the actual temperature detected is higher than the heat sealing temperature, de-energize, e.g. temporarily de-energize, at least one heating cartridge of the heat sealing station so as to make the actual temperature decrease,
  in case the actual temperature detected is lower than the heat sealing temperature, energize, e.g. temporarily energize, at least one heating cartridge of the heat sealing station so as to make the actual temperature increase.

In a 51st aspect according to any of the aspects from the 2nd to the 50th, the packaging apparatus comprises a first pre-heating unit and a second pre-heating unit arranged opposite to each other with respect to the elongated opening of the vacuum chamber and configured for receiving therebetween the terminal portion of each evacuated semi-sealed package.

In a 52nd aspect according to the 51st aspect, the pre-heating body of the first pre-heating unit is configured for pre-heating a first surface of said band of the terminal portion of the evacuated semi-sealed packages and the pre-heating body of the second pre-heating unit being configured for pre-heating a second surface, opposite to the first surface, of said band of the terminal portion of the evacuated semi-sealed packages.

In a 53rd aspect according to the 52nd aspect, the first surface is an upper surface of the band the band of the terminal portion of the evacuated semi-sealed packages and the second surface is a lower surface of the band of the terminal portion of the evacuated semi-sealed packages.

In a 54th aspect according to any of the aspects from the 37th to the 53rd, the heat sealing body is configured to act on the pre-heated band of the terminal portion of each evacuated semi-sealed package.

In a 55th aspect according to any of the aspects from the 37th to the 54th, the heat sealing body is configured for at least partially melting the pre-heated band of the terminal portion of the evacuated semi-sealed packages thereby forming heat sealed packages.

In a 56th aspect according to any of the aspects from the 37th to the 55th, the control unit is communicatively connected at least with the heat sealing body, wherein the sealing procedure further includes:
controlling the heat sealing body to heat the terminal portion of each evacuated semi-sealed package at the heat sealing temperature,
at least partially melting, at the heat sealing temperature, the pre-heated band of the terminal portion of the evacuated semi-sealed packages thereby forming heat sealed packages while the conveyor moves the terminal portion of the evacuated semi-sealed packages along or parallel to the longitudinal axis of the vacuum chamber.

In a 57th aspect according to any of the aspects from the 37th to the 56th, the control unit is communicatively connected also with the heat sealing body and is configured for controlling the heat sealing body to at least partially melt, at the heat sealing temperature, the pre-heated band of the terminal portion of the evacuated semi-sealed packages thereby forming heat sealed packages while the conveyor moves the terminal portion of the evacuated semi-sealed packages along or parallel to the longitudinal axis of the vacuum chamber.

In a 58th aspect according to any of the aspects from the 37th to the 57th, the heat sealing body is movable in height with respect to the sealing belt at least between a heat sealing position, such as a forward position, and a rest position, such as a backward position.

In a 59th aspect according to the 58th aspect, the heat sealing body is configured, in the heat sealing position, for heat sealing the terminal portion of the evacuated semi-sealed package at the heat sealing station.

In a 60th aspect according to any of the aspects from the 37th to the 59th, the heat sealing body comprises at least one heat sealing bar or at least one heat sealing roller.

In a 61st aspect according to the 60th aspect, the heat sealing bar comprises at least one housing and at least one heating cartridge arranged in the housing, the heating cartridge of the heat sealing bar being configured for heat sealing the terminal portion of each evacuated semi-sealed package thereby forming heat sealed packages.

In a 62nd aspect according to the 60th or the 61st aspect, the heat sealing bar has a first heating cartridge and a second heating cartridge arranged side by side.

In a 63rd aspect according to the 62nd aspect, the first heating cartridge and the second heating cartridge of the heat sealing bar share the same housing or are arranged in a respective first housing and in a respective second housing of the heat sealing bar.

In a 64th aspect according to any of the aspects from the 1st to the 63th, the heat sealer comprises a cooling station arranged downstream the heat sealing station with respect to the main movement direction, the cooling station being configured for allowing cooling the heat sealed terminal portion of the heat sealed packages.

In a 65th aspect according to the 64th aspect, the cooling station is configured for allowing cooling of the terminal portion of the heat sealed packages at least or mainly by natural convection and/or radiation and/or conduction.

In a 66th aspect according to the 64th or the 65th aspect, the cooling station comprises a first cooling section and a second cooling section arranged opposite to each other with respect to the elongated opening of the vacuum chamber and configured for receiving therebetween the terminal portion of each evacuated semi-sealed package.

In a 67th aspect according to any of the aspects from the 1st to the 66th, the heat sealer has a modular structure comprising at least one heat sealer module.

In a 68th aspect according to any of the aspects from the 1st to the 67th, the heat sealer comprises a first heat sealer module and a second heat sealer module, the first heat sealer module and the second heat sealer module being arranged opposite to each other with respect to the elongated opening of the vacuum chamber and being configured for receiving therebetween the terminal portion of each evacuated semi-sealed package.

In a 69th aspect according to the 68th aspect, each of the first heat sealer module and the second heat sealer module comprises a respective heat sealing body and a respective cooling section arranged downstream the heat sealing body with respect to the main movement direction.

In a 70th aspect according to the 68th or the 69th aspect, the heating cartridge of the first heat sealer module and the heating cartridge of the second heat sealer module are arranged so as to face each other and are configured for at least partially melting respective superposed pre-heated bands of the terminal portion of the evacuated semi-sealed packages.

In a 71st aspect according to the 68th or the 69th or the 70th aspect, each of the first heat sealer module and the second heat sealer module comprises a first pulley, a second pulley, a first driving belt and a second driving belt, each of the first driving belt and the second driving belt engaging the first pulley and the second pulley and being configured for driving the driven pulley.

In a 72nd aspect according to any of the aspects from the 1st to the 71st, the heat sealer comprises at least one pressure element configured for applying pressure to the terminal portion of the evacuated semi-sealed packages.

In a 73rd aspect according to any of the aspects from the 68th to the 72nd, each of the first heat sealer module and the second heat sealer module comprises at least one pressure element, the pressure element of the first heat sealer module and the pressure element of the second heat sealer module facing each other and being configured for applying pressure to respective opposed surfaces of the terminal portion of the evacuated semi-sealed packages.

In a 74th aspect according to the 72nd or the 73rd aspect, the pressure element is arranged at the heat sealing station.

In a 75th aspect according to the 72nd or the 73rd or the 74th aspect, the pressure element is further configured for tensioning the driving belt.

In a 76th aspect according to any of the aspects from the 72nd to the 75th, the pressure element comprises a first flank and a second flank opposite one another, spaced each other along a direction which is transversal to the main movement direction and longitudinally extend parallel to the longitudinal axis of the vacuum chamber, each of the first flank and the second flank being configured for tensioning a respective driving belt.

In a 77th aspect according to the 76th aspect, the heat sealing body of the first heat sealer module is interposed between the first flank and the second flank of the pressure element of the first heat sealer module and the heat sealing body of the second heat sealer module is interposed between the first flank and the second flank of the pressure element of the second heat sealer module.

In a 78th aspect according to any of the aspects from the 35th to the 76th, the control unit is communicatively connected with the pressure element of the first heat sealer module and with the pressure element of the second heat sealer module, said pressure elements being opposite to each other, the control unit being configured for:

moving said pressure elements towards opposed surfaces of the terminal portion of at least one evacuated semi-sealed package, control said pressure elements to apply pressure to the terminal portion of at least one evacuated semi-sealed package thereby clamping the terminal portion of the evacuated semi-sealed package, during the application of pressure by said pressure elements, control the heat sealing station to heat seal at least the terminal portion of at least one evacuated semi-sealed package thereby forming one heat sealed package.

In a 79th aspect according to any of the aspects from the 1st to the 78th, the heat sealer comprises at least one further pressure element configured for applying pressure to the terminal portion of the heat sealed packages.

In a 80th aspect according to the 79th aspect, the further pressure element is arranged downstream the heat sealing station with respect to the main movement direction and is configured for applying pressure to the heat sealed package.

In a 81st aspect according to the 79th or the 80th aspect, the further pressure element comprises a pressure roller.

In a 82nd aspect according to the 81st aspect, the first heat sealer module and the second heat sealer module comprise at least one respective pressure roller, the pressure rollers of the first heat sealer module and the pressure roller of the second heat sealer module facing each other.

In a 83rd aspect according to the 82nd aspect, the pressure roller of the first heat sealer module and the pressure roller of the second heat sealer module are arranged at the respective cooling section.

In a 84th aspect according to the 82nd or the 83rd aspect, the control unit is communicatively connected with the pressure roller of the first heat sealer module and with the pressure roller of the second heat sealer module and is configured for:

moving the pressure roller of the first heat sealer module and the pressure roller of the second heat sealer module towards opposed surfaces of the terminal portion of at least one heat sealed package, control the pressure roller of the first heat sealer module and the pressure roller of the second heat sealer module to apply pressure to the terminal portion of the heat sealed package.

In a 85th aspect according to any of the aspects from the 3rd to the 84th, the heat sealer comprises a sealing belt pulley, the sealing belt being engaged to the sealing belt pulley. In other words, while the first and the second pulley engage and move the driving belts, the sealing belt is engaged around the dedicated sealing belt pulley and one of the first and second pulleys. In a sub-aspect according to any one of the preceding aspects the sealing belt may be driven by one of the first and the second pulley or by the sealing belt pulley, while the first and the second pulleys act on driving belts; in a further sub/aspect the/a tensioning of the sealing belt may be obtained by adjusting the distance between the sealing belt pulley and one of the first and second pulley or may be obtained by a tensioning group acting directly of the sealing belt. In the embodiment shown in FIG. 7, one of the first and second pulleys may act as drive pulley for the driving belts and for the sealing belt 18. Yet in a further sub-aspect (in the case of a dedicated sealing belt pulley located in a zone intermediated between one of the two drive pulleys and the sealing station) the/a preheating unit is located between the sealing belt pulley and the heat sealing station along the path followed by the sealing belt, before the sealing belt reaches the preheating unit and either before the sealing belt reaches the dedicated sealing belt pulley or after the sealing belt has left the sealing belt pulley.

In a 86th aspect according to the 85th aspect, the sealing belt pulley is an idle pulley.

In a 87th aspect according to any of the aspects from the 3rd to the 86th, the heat sealer comprises a tensioning device configured for tensioning the sealing belt.

In a 88th aspect according to the 87th aspect, the tensioning device is connected to the drive pulley and is movable with respect to the heat sealing station, the tensioning device being configured for moving the drive pulley with respect to the heat sealing station and to adjust the tensioning of the sealing belt.

In a 89th aspect according to the 87th or the 88th aspect, the tensioning device is arranged upstream a pulley of the heat sealing station.

In a 90th aspect according to the 87th or the 88th or the 89th aspect, the tensioning device is arranged in proximity of the first pulley of the heat sealer.

In a 91st aspect according to any of the aspects from the 2nd to the 90th, the packaging apparatus comprises a vacuum unit comprising the vacuum chamber and a guide belt arranged inside the vacuum chamber and configured for contacting the terminal portion of the semi-sealed packages upstream the pre-heating unit and for moving the semi-sealed packages relative to the vacuum chamber throughout the elongated opening along the main movement direction.

In a 92nd aspect according to the 91st aspect, the control unit is communicatively connected with the guide belt and is configured for synchronizing the guide belt with at least one of the sealing belt and the conveyor, optionally with both the sealing belt and the conveyor.

In a 93rd aspect according to the 91st or the 92nd aspect, the guide belt and the sealing belt are offset with respect to a direction which is transversal to the main movement direction.

In a 94th aspect according to the 91st or the 92nd or the 93rd aspect, the terminal portion comprises a first band and a second band, the second band being interposed between the first band and the main portion of the semi-sealed package, the guide belt being configured for contacting the terminal portion of the semi-sealed packages at the first band, the sealing belt being configured for contacting the terminal portion of the semi-sealed packages at the second band.

In a 95th aspect according to any of the aspects from the 91st to the 94th, the control unit is configured for controlling the guide belt, the sealing belt and the conveyor to move at the same speed.

In a 96th aspect according to any of the aspects from the 2nd to the 95th, the vacuum chamber comprises a bottleneck portion configured for guiding the terminal portion of the semi-sealed package towards the elongated opening of the vacuum chamber.

In a 97th aspect according to any of the aspects from the 1st to the 96th, the vacuum chamber is configured for being moved at different heights with respect to the conveyor as a function of at least one dimension of the semi-sealed package or of at least one dimension of the one or more products housed inside the semi-sealed packages.

In a 98th aspect according to any of the aspects from the 35th to the 97th, the control unit is communicatively connected with the vacuum chamber or with movement means active on the vacuum chamber so as to change height of the vacuum chamber with respect to the conveyor and is further configured for moving the vacuum chamber at a specific height with respect to the conveyor as a function of at least one dimension of the semi-sealed package or of at least one dimension of the one or more products housed inside the semi-sealed packages.

In a 99th aspect according to any of the aspects from the 35th to the 98th, the control unit is configured for implementing a positioning procedure comprising:
identifying at least one dimension of the semi-sealed package or at least one dimension of the one or more products housed inside the semi-sealed packages,
setting the vacuum chamber at a specific height with respect to the conveyor as a function of the identified dimension of the semi-sealed package or of one or more products housed inside the semi-sealed package.

In a 100th aspect according to any of the aspects from the 1st to the 99th, the packaging apparatus comprises a waste removal station configured for removing at least a waste portion of the heat sealed packages, e.g. a waste portion of the terminal portion of the heat sealed packages which is distanced from, or opposed to, the main portion.

In a 101st aspect according to the 100th aspect, the waste removal station is arranged downstream the heat sealer with respect to the main movement direction.

In a 102nd aspect according to the 100th or the 101st aspect, the elongated opening of the vacuum chamber comprises an inlet section at which the terminal portion of the semi-sealed packages enters the vacuum chamber and an outlet section at which the terminal portion of the heat sealed packages exits the vacuum chamber, the inlet section and the outlet section being opposed each other with respect to a longitudinal extension of the elongated opening and to the main movement direction, the waste removal station being interposed between the inlet section and the outlet section.

In a 103rd aspect according to the 102nd aspect, the waste removal station is arranged in proximity of the outlet section.

In a 104th aspect according to any of the aspects from the 100th to the 103rd, the waste removal station is configured for removing the waste portion upstream with respect to the outlet section.

In a 105th aspect according to any of the aspects from the 100th to the 104th, the waste removal station comprises a cutting tool configured for cutting the waste portion from the semi-sealed package.

In a 106th aspect according to the 105th aspect, the cutting tool comprises at least one of a cutting blade, a cutting wheel, a guillotine, scissors or a knife.

In a 107th aspect according to any of the aspects from the 100th to the 106th, the control unit is communicatively connected with the waste removal station and is configured for removing, e.g. by means of the cutting tool, the waste portion from the semi-sealed package.

A 108th aspect relates to a packaging process of semi-sealed packages comprising the steps of:
providing at least one semi-sealed package having a terminal portion with at least one opening, such as an open end, and a main portion housing one or more products,
moving the semi-sealed package along a main movement direction,
evacuating gas present in the semi-sealed package and forming evacuated semi-sealed package while moving the semi-sealed package along the main movement direction,
heat sealing the terminal portion of the evacuated semi-sealed package,
before heat sealing the terminal portion of the evacuated semi-sealed package, pre-heating at least a band of the terminal portion of each evacuated semi-sealed package.

In a 109th aspect according to the 108th aspect, the packaging process makes use of the packaging apparatus according to any of the aspects from the 1st to the 107th and/or with any of the appended packaging apparatus claims.

In a 110th aspect according to the 108th or the 109th aspect, the step of pre-heating at least a band of the terminal portion of each evacuated semi-sealed package comprises pre-heating at least a band of the terminal portion of each evacuated semi-sealed package upstream the heat sealing station.

In a 111th aspect according to the 108th or 109th or 110th aspect, the step of pre-heating at least a band of the terminal portion of each evacuated semi-sealed package comprises:
pre-heating at least a heat conveying tract of a sealing belt acting on the terminal portion of the evacuated semi-sealed packages, the sealing belt optionally cooperating in guiding the terminal portion along the main movement direction,
pre-heating said band of the terminal portion of each evacuated semi-sealed package by means of the heat conveying tract of the sealing belt.

In a 112th aspect according to any of the aspects from the 108th to the 111th, the step of pre-heating said band of the terminal portion of each evacuated semi-sealed package by means of the heat conveying tract of the sealing belt comprises contacting said band of the terminal portion of each evacuated semi-sealed package with the heat conveying tract of the sealing belt.

In a 113th aspect according to any of the aspects from the 108th to the 112th, the packaging process comprises the step of providing a packaging apparatus according to any of the aspects from the 1st to the 107th and/or with any of the appended packaging apparatus claims, wherein the step of moving the semi-sealed package along a main movement direction comprises:
introducing at least the terminal portion of the semi-sealed package in the vacuum chamber at the elongated opening,
moving at least the terminal portion of the semi-sealed package inside the vacuum chamber along or parallel to the elongated opening,
optionally, moving the main portion of the semi-sealed package outside the vacuum chamber.

In a 114th aspect according to the 113th aspect, the step of moving at least the terminal portion of the semi-sealed package inside the vacuum chamber comprises moving at least the terminal portion of the semi-sealed package inside the vacuum chamber along or parallel to the elongated opening.

In a 115th aspect according to any of the aspects from the 108th to the 114th, the steps of heat sealing the terminal portion of the evacuated semi-sealed package and pre-heating at least a band of the terminal portion of each evacuated semi-sealed package are performed while continuously moving the semi-sealed package along the main movement direction by means of the conveyor and, optionally, also by means of the sealing belt and/or by means of the guide belt.

In a 116th aspect according to any of the aspects from the 108th to the 115th, the packaging process comprises the step of guiding the terminal portion of evacuated semi-sealed packages along the main movement direction at least at the heat sealing station while avoiding that said terminal portion sticks to the heat sealing station.

In a 117th aspect according to any of the aspects from the 108th to the 116th, the packaging process comprises the step of cooling the terminal portion of the heat sealed package.

In a 118th aspect according to the 117th aspect, the step of cooling the terminal portion of the heat sealed package comprises allowing cooling the terminal portion of the heat sealed package at least or mainly by natural convection and/or radiation and/or conduction.

In a 119th aspect according to the 117th or the 118th aspect, the step of cooling the terminal portion of the heat sealed package comprises letting the terminal portion of the heat sealed package pass through a cooling section, e.g. a cooling section of a packaging apparatus, for a predetermined time period.

In a 120th aspect according to the 117th or the 118th or the 119th aspect, while cooling the terminal portion of the heat sealed package, pressure is applied to the terminal portion of the heat sealed package.

In a 121st aspect according to any of the aspects from the 108th to the 120th, the step of heat sealing the terminal portion of the evacuated semi-sealed package comprises applying pressure to the terminal portion of the evacuated semi-sealed package.

In a 122nd aspect according to the 120th and the 121st aspects, the pressure applied to the terminal portion of the heat sealed package while cooling is lower than the pressure applied to the terminal portion of the evacuated semi-sealed package while heat sealing.

CONVENTIONS AND DEFINITIONS

Figure 1:
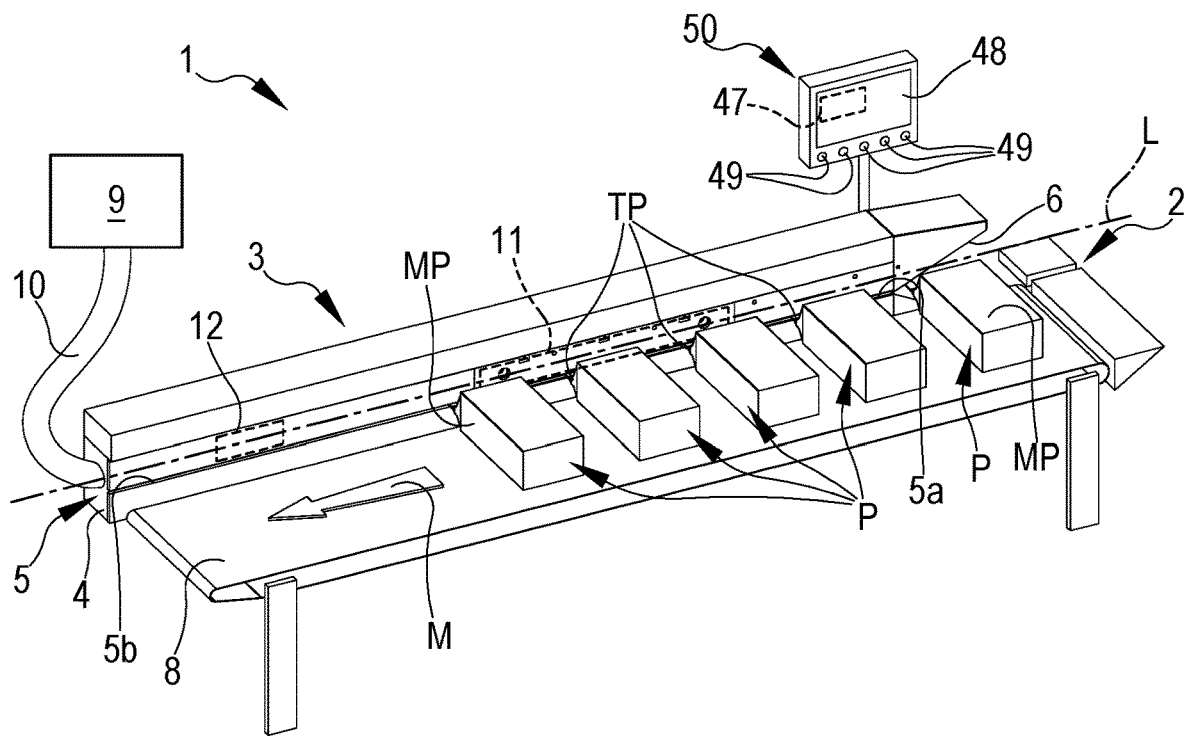
FIG. 1 shows a view of a packaging apparatus according to the present invention.

In the context of the present document, whenever semi-sealed package is referred to, it is understood that it refers to a film wrap or film envelope, for example made entirely or at least partly of plastic material, surrounding and containing the product or products to be packaged and having at least one aperture or opening allowing exchange of gas between the inside and the outside of the semi-sealed package.

In the context of the present document, whenever evacuation or vacuumization in terms of gas extraction is referred to, it is understood that the term "gas" may comprise an individual particular gas or a mixture of gases and may, for example, refer to air (i.e. consist of a mixture of gases corresponding to ambient air). In accordance with possible variants, semi-sealed packages may be flushed with protective gas or gases (sometimes also referred to as "inert" gas). It is noted that any known protective gas or gas mixture can be employed, for example $CO_2$. Gas may be injected into the semi-sealed package in the space between the product and the film using known techniques. Remaining gas inside the package after gas or air has been evacuated therefrom and after the package has been sealed ensures a desired residual level of $O_2$ inside the package. Reducing the level of residual $O_2$ in the package is particularly beneficial when packaging perishable products (e.g., cheese with low gassing level during maturation). In some applications, a residual $O_2$ level of 5% to 6% may be sufficient. In other applications, a residual $O_2$ level lower than 5%, for example 1% or lower, may be desirable. It is noted that, using embodiments of the present invention, practically any residual $O_2$ level necessary or desired for an individual packaging application may be set accordingly.

In the context of the present document, whenever evacuated semi-sealed package is referred to, it is understood that it refers to a semi-sealed package which has been evacuated at least partly.

In the context of the present document, whenever heat sealed package is referred to, it is understood that it refers to a package which has been heat sealed after having been evacuated.

In the context of the present document, whenever upstream and downstream are referred to, it is understood that they refer to the location of a certain station, element or component of the packaging apparatus with respect to a processing direction of the above defined packages (semi-sealed packages, evacuated semi-sealed packages and heat sealed packages) along which the packages are processed. The terms upstream and downstream may refer to a main movement direction, e.g. a main advancement direction, of the above defined packages along the packaging apparatus.

In the context of the present document, whenever operating conditions of the packaging apparatus are defined, it is understood that they refer to the use conditions of the packaging apparatus in which the packaging apparatus is used for packaging products. In operating conditions, the packaging apparatus performs a packaging process which it is designed for. The packaging process may be one of the processes described herein and or a process according to any one of the appended claims.

In the context of the present document, whenever a belt is defined, it is understood that the belt may be an endless belt, i.e. a belt defining a closed loop. Each belt may be configured for moving continuously along the respective closed loop.

DETAILED DESCRIPTION

FIG. 1 shows a first embodiment of a packaging apparatus 1 according to the present invention. The packaging apparatus 1 is designed for packaging products by processing a plurality of semi-sealed packages P. Packages are generally indicated with reference P, irrespective of their initial, intermediate or final processing condition and position along the packaging apparatus (i.e. irrespective of the packages P being semi-sealed packages, evacuated semi-sealed packages, heat sealed packages, finished packages as hereinafter described). The semi-sealed packages P have a terminal portion TP with at least one opening (i.e. open terminal portion) and a main portion MP housing one or more products. The opening may be an open end of the semi-sealed package P. The main portion MP presents a closed terminal portion of the semi-sealed package, which is for example opposite with respect to the open terminal portion TP of the semi-sealed package P. In greater detail, the terminal portion TP of the semi-sealed packages may comprise a first band TP1 and a second band TP2 flanking each other (see FIG. 4A). The second band TP2 is interposed between the first band TP1 and the main portion MP of the semi-sealed package P.

One or more products may be arranged inside the main portion MP of the semi-sealed package P in different ways. Note however, the way products are housed inside the semi-sealed package P is not relevant to the invention.

For example, products may be loaded onto a film, for example supplied from a film roll. The film is subsequently longitudinally and transversally sealed in order to create a sequence of semi-sealed packages P, with products placed inside each of the semi-sealed packages P formed by the tubular film. The formation of semi-sealed packages P from a continuous film may be performed at a loading station 2 of the packaging apparatus 1.

In an alternative embodiment, products may have been placed in pre-formed bags (i.e., semi-sealed packages P) made from packaging film.

In both the above described embodiments, the packaging apparatus 1 may comprise a loading station 2 at which semi-sealed packages P (having the above described structure) requiring gas evacuation and then heat sealing are loaded. The semi-sealed packages P may be loaded at the loading station 2 with the proper orientation, or they may be rearranged at the loading station 2 according to a predefined or desired orientation.

The packaging apparatus 1 comprises a vacuum unit 3 provided with a vacuum chamber 4 extending along a longitudinal axis L. The vacuum chamber 4 comprises a casing defining an internal volume of the vacuum chamber 4 where, in operating conditions of the packaging apparatus 1, an internal vacuum pressure (i.e., a pressure below ambient pressure present in the atmosphere external to the casing) is defined.

The vacuum chamber 4 has an elongated opening 5 extending parallel to the longitudinal axis L. The elongated opening 5 has an inlet section 5a at which the terminal portion TP of the semi-sealed packages P enters the vacuum chamber 4 and an outlet section 5b at which the terminal portion TP of the heat sealed packages P exits the vacuum chamber 4. The inlet section 5a and the outlet section 5b of the elongated opening 5 are opposed to each other along a longitudinal extension of the elongated opening 5: said in other words, the inlet section 5a and the outlet section 5b are at respective opposite ends of the elongated opening 5. In FIG. 1, the elongated opening is a longitudinal straight slot 5 continuously extending parallel to the longitudinal axis L of the vacuum chamber 4. In possible variants, the elongated opening 5 may comprise at least a curvilinear tract or may be entirely curvilinear.

The vacuum chamber 4 may comprise at least two consecutive portions each one designed, when the packaging apparatus 1 is in operation, to be subjected to a respective internal vacuum pressure different from that of the other portion. The internal vacuum pressure inside the mentioned consecutive portions of the vacuum chamber 4 may diminish proceeding along a main movement direction M (schematically represented in FIG. 1 by arrow M) defined along the packaging apparatus 1, i.e., proceeding from the inlet section 5a to the outlet section 5b of the elongated opening 5. Thus, when apparatus 1 is operated, the portion closest to the inlet section 5a will be subject to a vacuum level, the next portion will be subject to a higher level of vacuum (and thus a lower absolute pressure) and so on until the portion closest to the outlet pressure, which will be subject to the highest level of vacuum of all portions (and thus to the lowest absolute pressure). By virtue of the above provisions, the vacuum chamber 4 is configured for progressively evacuating the semi-sealed packages P.

The vacuum chamber 4 comprises a bottleneck portion 6 shaped for guiding the terminal portion TP of the semi-sealed package P towards the inlet section 5a of the elongated opening 5 of the vacuum chamber 4. The bottleneck portion 6 is basically an access portion at which the semi-sealed packages P are funneled towards the vacuum chamber 4. As shown in FIG. 1, the bottleneck portion 6 is tapered and comprises a passage section which narrows down in a direction entering the inlet section 5a of the elongated opening 5.

The vacuum unit 3 may comprise a guide belt 7 arranged inside the vacuum chamber 4 (or having a major portion arranged inside the vacuum chamber 4). In a preferred embodiment, the vacuum unit 3 comprises two cooperating guide belts 7 each having an operative tract 7a facing the operative tract 7a of the other guide belt 7 and developing parallel to the longitudinal axis L of the vacuum chamber 3. The operative tracts 7a of the two guide belts 7 are configured for contacting opposite sides the terminal portion TP of the semi-sealed packages P at the first band TP1 (see FIG. 4A) and for cooperating with conveyor 8 for moving the semi-sealed packages P relative to the vacuum chamber 4 along the elongated opening 5 parallel to the main movement direction M. In practice, the movement of the packages P along the main movement direction M defines an advancement path of the packages P parallel to the vacuum chamber 4 and hence along the packaging apparatus 1. Going in further detail, each guide belt 7 has an outer surface designed to contact the terminal portion of the semi-sealed packages P at the first band TP1 for promoting movement of the terminal portions TP and at the same time facilitate gas evacuation. For this purpose, the outer surface of at least one of the guide belts 7 may present parallel grooves or other surface formations aimed at allowing gas escape while the guide belt operative tracts 7a engage the terminal portions TP and thus efficient evacuation of the semi-sealed packages P during their motion along the advancement path. Indeed, in operating conditions of the packaging apparatus 1, the terminal portions TP of the semi-sealed packages P contacting the guide belt outer surface form gas evacuation channels at the parallel grooves or other surface formations allowing an efficient evacuation of the semi-sealed packages P.

As mentioned, the packaging apparatus 1 further comprises a conveyor 8. As shown in FIG. 1, the conveyor 8 is arranged side by side with respect to the vacuum chamber 4 and may be in the form of an endless belt. As shown in FIG. 1, the conveyor 8 is arranged downstream with respect to the loading station 2 and is configured for receiving semi-sealed packages P coming from the loading station 2. The semi-sealed packages P received from the loading station 2 are preferably at a predefined or desired orientation with respect to the vacuum chamber 4 (see FIG. 1) for the terminal portions TP to move inside the vacuum chamber 4. The conveyor 8 is configured for assisting in moving the packages P along the main movement direction M and substantially parallel to the elongated opening 5. The conveyor 8 has a conveying surface, e.g. a horizontal conveying surface, designed to receive the main portion MP of the packages P and to move the main portion MP of the packages along the main movement direction M outside the vacuum chamber 4 (see FIG. 1), while the terminal portions TP of the packages P are hosted inside the vacuum chamber 4 and transported by the guide belt(s) 7. In order to allow an efficient transportation of the packages P, the conveying surface may be provided with gripping means or may comprise non-slippery material to guide the packages P along the main movement direction M with no risk of relative sliding between the packages P and the conveying surface of conveyor 8. The conveyor 8 and the guide belt(s) 7 are synchronized with each other and may move at the same speed, thereby maintaining the predefined or desired orientation of the packages P (see FIG. 1). In possible variants, the packaging apparatus 1 may have one single guide belt 7 (for example cooperating with a flat surface) or may be devoid of guide belts 7 with the transportation of the packages P along the main movement direction M throughout the packaging apparatus 1 being performed or mainly performed by the conveyor 8. In certain currently preferred variants, a further belt may contribute to movement of the packages/semi-sealed packages P: for example a sealing belt may operate at a discrete tract of the elongated opening 5 such as a central tract of the elongated opening 5 interposed between and distanced from the inlet section 5a and the outlet section 5b of the elongated opening 5.

The predefined or desired orientation of the packages P provides for the packages P being arranged on the conveyor 8 so that the open end of the terminal portion TP of each semi-sealed package P, i.e. an unsealed portion of the semi-sealed package P, is positioned facing towards the side of the conveyor 8 at which the vacuum chamber 4 is located (e.g. towards the right side of the conveyor 8 with respect to the main movement direction M shown in FIG. 1). As shown in FIG. 1, the terminal portion TP of the semi-sealed packages P and hence their open ends are aligned with respect to the side of the conveyor 8 facing the vacuum chamber 4.

It is noted that the semi-sealed packages P processed by the packaging apparatus 1 may be of different sizes, in particular each semi-sealed packages P may present different length and/or width and/or height compared to other packages P being processed in the same packaging apparatus 1.

In FIG. 1, packages P are shown having all the same size. In order to deal with semi-sealed packages P having different sizes, the packaging apparatus 1 may be configured for moving the vacuum chamber 4 at different heights with respect to the conveyor 8. The packaging apparatus 1 may therefore be provided with movement means active on the vacuum chamber 4 and or on the conveyor 8 so as to adjust the relative height of the vacuum chamber 4 with respect to the conveyor 8. In an exemplary embodiment, the movement means may comprise telescopic elements, such as telescopic rods, or guides of other nature cooperating with actuators. The height at which the vacuum chamber 4 is placed with respect to the conveyor 8 is a function of at least one dimension of the semi-sealed packages P or of at least one dimension of the one or more products housed inside the semi-sealed packages P. The movement of the vacuum chamber 4 at different heights with respect to the conveyor 8 implies the movement of the bottleneck portion 6 of the vacuum chamber 4 at different heights with respect to the conveyor 8.

The packaging apparatus 1 further comprises evacuation means 9 fluidly communicating with the vacuum chamber 4. The evacuation means 9 may fluidly communicate with the vacuum chamber 4 by means of a duct 10 of the packaging apparatus 1, such as flexible duct 10. The evacuation means 9 are configured for providing the vacuum chamber 4 with an internal vacuum pressure that is lower than an ambient pressure defined outside the vacuum chamber 4. As shown in FIG. 1, the terminal portion TP of the semi-sealed packages P is at least partially arranged inside the vacuum chamber 4 such that its open end is located inside the vacuum chamber 4. Hence, the internal vacuum pressure formed by the evacuation means 9 allows the vacuum chamber 4 to evacuate gas present in the semi-sealed packages P. The evacuation means 9 may be configured for forming different internal vacuum pressures at adjacent portions of the vacuum chamber 4, in operating conditions of the packaging apparatus 1. The evacuation means 9 may comprise a vacuum source, such as at least a vacuum pump. In a possible variant, a dedicated vacuum source may be provided for each distinct portion of the vacuum chamber 4. Each of the dedicated vacuum sources fluidly communicates with the respective portion of the vacuum chamber 4 and is configured for defining therein a respective internal vacuum pressure.

Downstream the bottleneck portion 6, a main processing section 11 of the packaging apparatus 1 is defined. The main processing section 11 is configured for heat sealing the terminal portions TP of the semi-sealed packages P entering the bottleneck portion 6 thereby closing the opening present in each semi-sealed package P and forming heat sealed packages P provided with sealed terminal portions TP located inside the vacuum chamber 4. The components of the main processing section 11 are described in greater detail below.

The packaging apparatus 1 further comprises a waste removal station 12 arranged between the main processing section and the outlet section 5b of the elongated opening 5, i.e. downstream the main processing section with respect to the main movement direction M and upstream and in proximity to the outlet section 5b. The waste removal station 12 receives the heat sealed packages P from the main processing section and is configured for removing at least a waste portion of the heat sealed packages P. For example, the waste removal section 12 may be configured to remove a waste portion of the terminal portion TP of the heat sealed packages P extending beyond the one or more heat sealed bands formed by the main processing section 11. In other words, the waste portion removed from each sealed package P is opposed to the main portion MP with respect to the heat seal which is formed, at the processing section, in the terminal portion TP of the heat sealed packages P. The waste removal station 12 may be configured for removing the waste portion before the terminal portion TP, or a remaining part of it, of the heat sealed packages P exits the vacuum chamber 4. Alternatively, a waste removal station 12 may be provided downstream the vacuum chamber 4. The waste removal station 12 may comprise a cutting tool configured for cutting the waste portion from the semi-sealed package. The cutting tool may be in the form of at least one of a cutting blade, a cutting wheel, a guillotine, scissors or a knife.

The packaging apparatus 1 may further comprise an unloading station (not shown in the attached figures) where heat sealed packages P exiting the vacuum chamber are collected.

The main processing section 11 comprises at least one heat sealer 13 which is hereinafter described in detail.

The heat sealer 13 extends approximately parallel to the longitudinal axis L of the vacuum chamber 4 and is housed inside the casing of the vacuum chamber 4.

The heat sealer 13 is provided with a heat sealing station 14 and a cooling station 15. The heat sealing station 14 and the cooling station 15 are arranged along the main movement direction M. The heat sealing station 14 is configured for heat sealing an area (typically in the form of one or more bands) of the terminal portion TP of the evacuated semi-sealed package P to thereby form heat sealed packages P. During the heat sealing operation taking place at the heat sealing station 14, opposed layers of the plastic film forming the terminal portion TP are at least partly fused to cause heat bonding along one or more sealing areas, e.g., in the form of one or more sealing bands extending substantially parallel to the longitudinal axis L. As a consequence of the heat sealing phase, at least the terminal portion TP of the heat sealed packages P may present areas where the plastic material is still very hot when exiting the heat sealing station 14. The cooling station 15, which is arranged adjacent and downstream the heat sealing station 14, allows cooling and thus structural stabilization of the heat sealed terminal portion TP of the heat sealed packages P.

Figure 2:
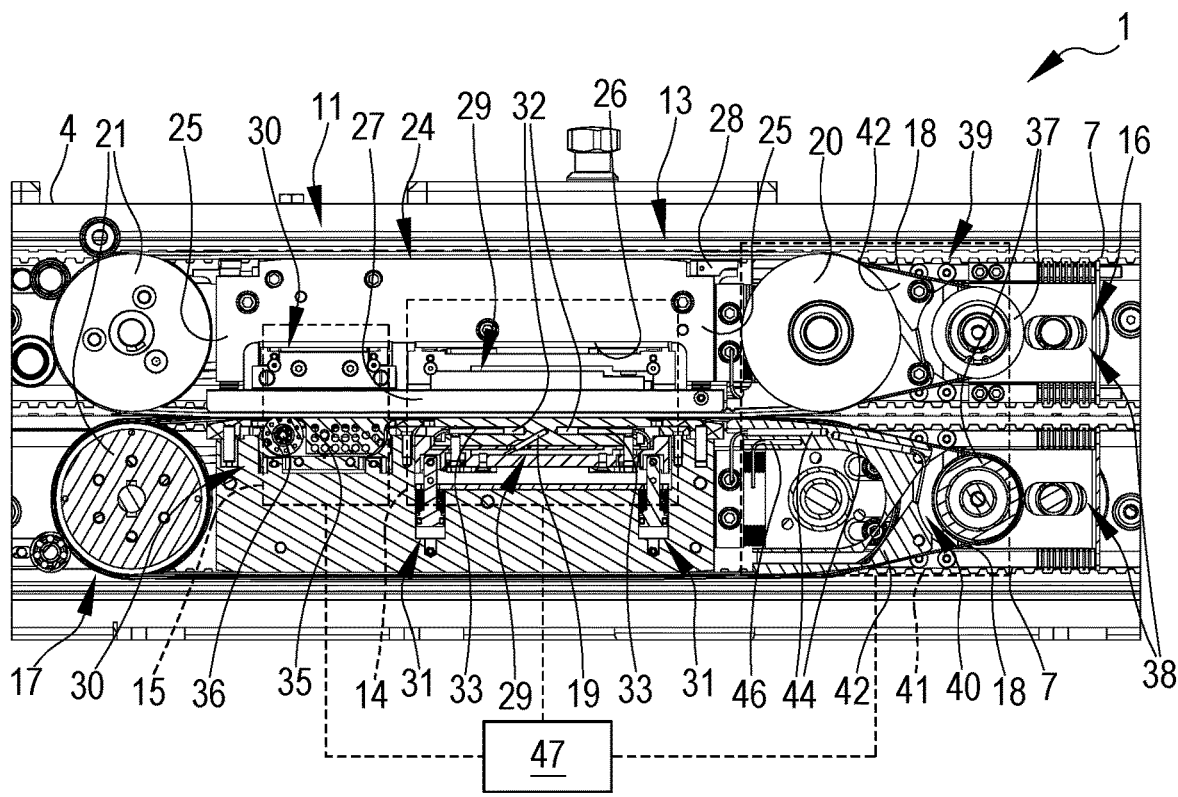
FIG. 2 shows a section of the packaging apparatus of FIG. 1 depicting the main processing section of the packaging apparatus.

The heat sealer 13 has a modular structure and comprises at least one heat sealer module 16, 17. FIG. 2 shows a longitudinal portion of the packaging apparatus 1 at which the main processing section 11 is located and whose upper part of the vacuum chamber 4 has been sectioned in a different plane with respect to the lower part. The packaging apparatus 1 comprises a first heat sealer module 16 and a second heat sealer module 17 (see FIG. 2). As shown in FIGS. 2, 3, 4, 6 and 7, the first heat sealer module 16 and the second heat sealer module 17 are opposed to each other and may for example be symmetrically arranged, with respect to an ideal plane parallel to the elongated opening 5. In the example shown in the attached drawings, the first and second heat sealer modules 16, 17 are opposed, for example symmetrically opposed, with respect to an ideal horizontal plane, which is parallel to the conveying surface of the conveyor 8 and parallel to the longitudinal axis L of the vacuum chamber 4. Hence, the first heat sealer module 16 and the second heat sealer module 17 are relatively positioned and configured to allow the heat sealer 13 to receive between the two heat sealer modules 16, 17 the terminal portion TP of each evacuated semi-sealed package P to be heat sealed.

As the two heat sealer modules 16, 17 present the same main components, a single heat sealer module 16, 17 is described in the following. Unless otherwise specified, therefore, the components and related functions defined with respect to one heat sealer module 16, 17 are applicable to the first heat sealer module 16 and to the second heat sealer module 17.

Each heat sealer module 16, 17 comprises a respective sealing belt 18. The sealing belt 18 may be basically defined as a main belt of the heat sealer module 16, 17. The sealing belt 18 of each heat sealer module 16, 17 is configured for contacting the terminal portion TP of the semi-sealed packages P at the second band TP2 and for cooperating in guiding the terminal portion TP of the evacuated semi-sealed package P. In practice, the sealing belt 18 guides the sealing portion TP along a tract of the advancement path which may coincide with the discrete tract of the elongated opening 5 described above, e.g. with the central tract of the elongated opening 5. The sealing belt 18 is configured for guiding the terminal portion TP of the evacuated semi-sealed packages P along the main movement direction M at the heat sealing station 14 (see FIG. 3), without sticking or attaching to the plastic material of the semi-sealed package(s) P being processed. In order to avoid sticking while guiding the terminal portion TP of the evacuated semi-sealed packages P, the sealing belt 18 comprises non-stick material. The non-stick material is arranged at least on a surface of the sealing belt 18 designed to come into contact with a heat sealing surface of the heat sealing station 14. In an embodiment, each sealing belt 18 comprises a non-stick material body, such as a body in a non-stick polymer material, reinforced with reinforcing material, such as glass or other reinforcing fiber. In the currently preferred embodiment, the sealing belt 18 has a body in polytetrafluoroethylene reinforced with glass fiber. The polytetrafluoroethylene material provides the sealing belt 18 with optimal non-stick properties and hence allows the sealing belt 18 to non-stick guide the terminal portion TP of the evacuated semi-sealed packages along the main movement direction M at the heat sealing station 14. In a possible variant, instead of providing the body of the sealing belt 18 in polytetrafluoroethylene, the polytetrafluoroethylene may be provided only at the contact surface of the sealing belt 18 with the heat sealing surface of the heat sealing station 14, e.g. at an external surface of the sealing belt 18 designed to come into contact with the heat sealing surface. According to additional possible variants, a non-stick material alternative to the polytetrafluoroethylene may be used, without departing from the scope of the invention.

The heat sealer module 16, 17 may further comprise at least one heat sealing temperature sensor 19 configured for detecting a heat sealing temperature. The heat sealing temperature sensor 19 may be a thermocouple.

The heat sealer module 16, 17 further comprises a first pulley 20 and a second pulley 21 arranged opposite each other with respect to the heat sealing station 14. One of the first pulley 20 and the second pulley 21 is a drive pulley, such as a motorized pulley, and the other one of the first pulley 20 and the second pulley 21 is a driven pulley. In a possible embodiment, the heat sealer module 16, 17 may provide for the first pulley 20 being a driven pulley and for the second pulley 21 being a drive pulley. In an alternative embodiment such as the one shown in FIG. 6, the first pulley 20 may be the drive pulley and the second pulley 21 may be the driven pulley. The first pulley 20 and the second pulley 21 are mounted on a respective shaft and configured for rotating around a respective rotation axis. The rotation axis of the first pulley 20 and the rotation axis of the second pulley 21 are parallel. The first pulley 20 is arranged upstream the heat sealing station 14 with respect to the main movement direction M and is configured for directing the sealing belt 18 towards the heat sealing station 14. The second pulley 21 is configured for circulating back, downstream the heat sealing station 14 and the cooling station 15, the sealing belt 18 towards the first pulley 20.

Each of the first pulley 20 and the second pulley 21 comprises at least an annular groove. In the preferred embodiment, each of the first pulley 20 and the second pulley 21 comprises a first annular groove and a second annular groove which are spaced from each other parallel the rotation axis of the pulley 20, 21. The annular grooves of the same pulley 20, 21 may define axially opposed shoulders of the pulley 20, 21. The annular grooves of the first pulley 20 and of the second pulley 21 define two pairs of facing annular grooves. A first pair of annular grooves is formed by the first annular groove of the first pulley 20 and by the corresponding first annular groove of the second pulley 21, while a second pair of annular grooves is formed by the second annular groove of the first pulley 20 and by the corresponding second annular groove of the second pulley 21

Figure 3:
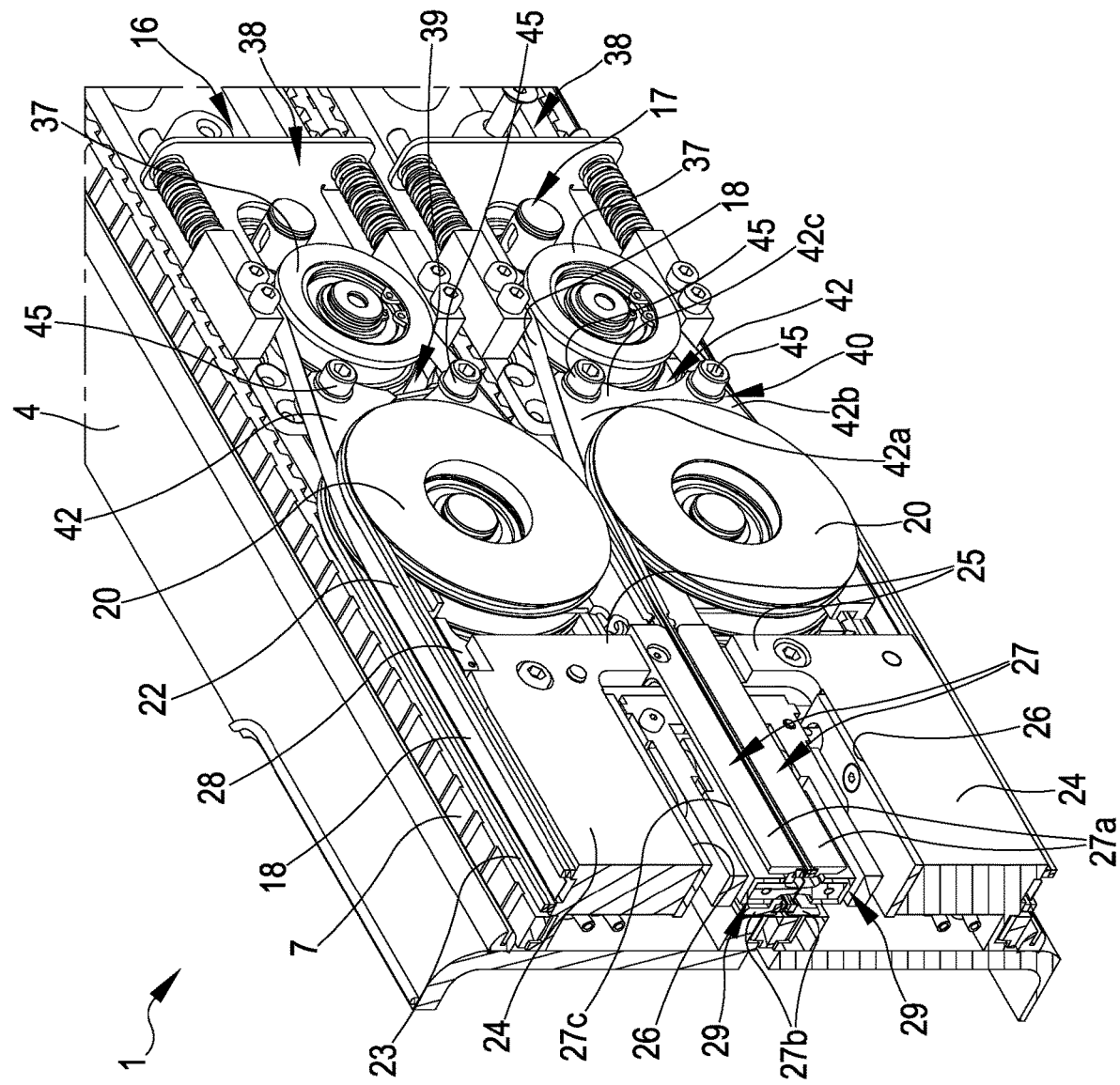
FIG. 3 shows a longitudinal section of the packaging apparatus of FIG. 2, taken by means of a sectioning plane sectioning the heat sealer of the packaging apparatus at the heat sealing station.

The heat sealer module 16, 17 further comprises at least one driving belt 22, 23 engaging the first pulley 20 and the second pulley 21. The driving belt 22, 23 is powered one of the first pulley 20 and the second pulley 21 (drive pulley) and is configured for driving other one of the first pulley 20 and the second pulley 21 (driven pulley). In the embodiments shown in FIGS. 3 and 6, the heat sealer module 16, 17 comprises a first driving belt 22 and a second driving belt 23. As shown in FIG. 3, the first driving belt 22 is received by the first pair of facing annular grooves and the second driving belt 23 is received by the second pair of facing annular grooves. The first driving belt 22 and the second driving belt 23 are synchronized and also assist in accompanying the terminal portions TP of the packages P in proper position for sealing. At least the first pulley 20, or both the first pulley 20 and the second pulley 21, may be in a material having considerable heat transfer properties, such as metallic material. Providing at least the first pulley 20 or both the first pulley 20 and the second pulley 21 in a material having considerable heat transfer properties allows the pulley 20, 21 to transfer heat to the sealing belt 18. This is particularly advantageous in possible embodiments wherein at least the first pulley 20 is pre-heated so as to transfer heat to the sealing belt 18, thereby pre-heating the sealing belt 18 (see the embodiment of FIG. 6).

Between the first pulley 20 and the second pulley 21, a bracket 24 of the heat sealer module 16, 17 is arranged. The bracket 24 longitudinally extends between the pulleys 20, 21 approximately parallel to the longitudinal axis L of the vacuum chamber 4. The bracket 24 may have an overall "U-shape" provided with lateral legs 25 and a main central portion joining the lateral legs 25 and defining a longitudinal recess 26. The longitudinal recess 26 is hence defined between the lateral legs 25 and has a bottom wall which is retracted with respect to an end portion of each lateral leg 25.

The bracket 24 is connected to a pressure element 27 of the heat sealer module 16, 17. The connection between the bracket 24 and the pressure element 27 may be realized by elastic elements, such as one or more springs. The springs may be at least partially house at respective legs 25 of the bracket 24. The pressure element 27 is configured for applying pressure to the terminal portion TP of the evacuated semi-sealed packages and is also configured for tensioning at least one driving belt 22, 23, optionally both driving belts 22, 23. The pressure element 27 may comprise a first flank 27a and a second flank 27b, each configured to act on a respective of said two driving belts 22, 23. The first flank 27a and the second flank 27b are opposite one another, spaced from each other along a direction which is transversal to the main movement direction M and longitudinally extend parallel to the longitudinal axis L of the vacuum chamber 4. Between the first flank 27a and the second flank 27b at least a passage opening 27c is defined. The first flank 27a and the second flank 27b act as pressure bars on respective bands of the terminal portion TP of the evacuated semi-sealed packages P. In greater detail, the first flank 27a may act as a pressure bar on the second band TP2 of the terminal portion TP of the evacuated semi-sealed packages P. The first flank 27a is configured for tensioning the first driving belt 22 and the second flank 27b is configured for tensioning the second driving belt 23. The pressure element 27 may be movable in height at least between an operating position and a rest position. In the operating position the pressure element 27 tensions the first driving belt 22 and the second driving belt 23 by means, respectively, of the first flank 27a and of the second flank 27b and applies pressure to the terminal portion TP of the evacuated semi-sealed packages P as above described. In the rest position the pressure element 27 does not apply pressure to the terminal portion TP of the evacuated semi-sealed packages P. In the rest position, the pressure element 27 is retracted with respect to the operating position and may, or may not, residually tensioning the driving belts 22, 23. As shown in particular in FIG. 3, the pressure element 27 may be monolithic and the first flank 27a and the second flank 27b may hence be integrated in a single pressure element 27. In a possible variant, the first and second flanks 27a, 27b may not be integrated in a single pressure element 27 and may rather form separated pressure bars movable together or independently from each other. In a possible variant, the tensioning function herein described with reference to the first flank 27a and the second flank 27b of the pressure element 27 may be implemented by means of separated specifically designed elements. In that variant, the heat sealer module 16, 17 may be provided with one or more pressure elements configured for applying pressure to the terminal portion TP of the evacuated semi-sealed packages P and with one or more tensioning elements configured for tensioning, together or independently, the driving belts 22, 23.

The transition between the operating position and the rest position of the pressure element 27 is possible by means of a switch 28 of the heat sealer module 16, 17. The switch 28 is configured for switching the pressure element 27 from the rest position to the operating position, and vice versa. The switch 28 may be a mechanical switch and may be automated or manually operated.

Between the first pulley 20 and the second pulley 21, a heat sealing body 29 and a cooling section 30 of the heat sealer module 16, 17 are also arranged. As shown in FIG. 2, the heat sealing body 29 and the cooling section 30 are at least partially arranged in the longitudinal recess 26. With reference to the modular structure of the heat sealer 13, the heat sealing body 29 of the first heat sealer module 16 and the heat sealing body 29 of the second heat sealer module 17 are arranged opposite to each other according to the above described configuration (see FIG. 2 and FIG. 6). The heat sealing body 29 of the first heat sealer module 26 and the heat sealing body 29 of the second heat sealer module 17 face each other and form the heat sealing station 14 of the packaging apparatus 1. Due to the above described opposed arrangement, the heat sealing body 29 of the first heat sealer module 16 and the heat sealing body 29 of the second heat sealer module 17 are configured for receiving therebetween the terminal portion TP of each evacuated semi-sealed package P and for heat sealing at least one band thereby determining a sealed closure of each package P (see FIG. 4A wherein the second band TP2 is undergoing heat sealing). The cooling section 30 of the first heat sealer module 16 and the cooling section 30 of the second heat sealer module 17 are arranged opposite to each other according to the above described configuration (see FIG. 2 and FIG. 6). The cooling section 30 of the first heat sealer module 16 and the cooling section 30 of the second heat sealer module 17 face each other and form the cooling station 15 of the packaging apparatus 1. Due to the above described reciprocal arrangement, the cooling section 30 of the first heat sealer module 16 and the cooling section 30 of the second heat sealer module 17 are configured for receiving therebetween the terminal portion TP of each evacuated and sealed package P in order to allow cooling of the parts of the package P which have been interested by heat sealing and which therefore may still be at a relatively high temperature.

Moving now to a more detailed description of the heat sealing body 29, it should be noted that the heat sealing body 29 is movable in height and is configured for assuming positions having respective different heights with respect to the sealing belt 18 and hence with respect, with reference to operating conditions of the packaging apparatus 1, to the terminal portion TP of the evacuated semi-sealed packages P passing through the heat sealer 13. The heat sealing body 29 is movable at least between a heat sealing position and a rest position. The heat sealing position may be a forward position and the rest position may be a backward position. The forward position and the backward position may be defined with respect to the bottom wall of the longitudinal recess 26. In operating conditions of the packaging apparatus 1, the heat sealing body 29 in the forward heat sealing position applies heat and pressure and heat seals the terminal portion TP of the evacuated semi-sealed packages P passing through the heat sealing station 14. The transition between the forward heat sealing position and the backward rest position of the heat sealing body 29 is possible by means of at least one actuator 31. The actuator 31 is configured for moving the heat sealing body 29 from the backward rest position to the forward heat sealing position, and vice versa. The actuator 31 may be a pneumatic actuator, an electric actuator, a hydraulic actuator or an actuator of other nature. FIG. 2 depicts the second heat sealer module 17 which has been sectioned and shows that its heat sealing body 29 is movable by means of a pair of pneumatic actuators 31 acting on respective longitudinal end portions of a shuttle housing the heat sealing body 29. The heat sealing body 29 may be in a material configured for conveying heat. The material of the heat sealing body 29 may be a material having considerable heat transfer properties, such as metallic material.

The heat sealing body 29 may be in the form of a heat sealing bar or a heat sealing roller. In the embodiments depicted in the attached figures, the heat sealing body is in the form of a movable heat sealing bar 29. As shown in FIG. 3, the heat sealing bar 29 at least partially develops through the passage opening 27c of the pressure element 27 and more specifically may extend between the first and second flank 27a, 27b. The heat sealing bar 29 comprises at least one housing 32 and at least one heating cartridge 33 arranged in the housing 32. In FIG. 2 a heat sealing bar 29 having a first heating cartridge 33 and a second heating cartridge 33 arranged side by side in respective housings 32 is depicted. Each heating cartridge 33 of the heat sealing bar 29 may be configured for heating the material of the terminal portion TP of the evacuated semi-sealed packages P up to its melting point. Each heating cartridge 33 of the heat sealing bar 29 may be hence configured for at least partially melting the material of terminal portion TP of the evacuated semi-sealed packages P at one or more prefixed areas, for example at one or more prefixed bands. Each heating cartridge 33 of the heat sealing bar 29 may be chosen or controlled as a function of the material of the semi-sealed packages P. Each heating cartridge 33 of the heat sealing bar 29 may be electrically powered.

Figure 4:
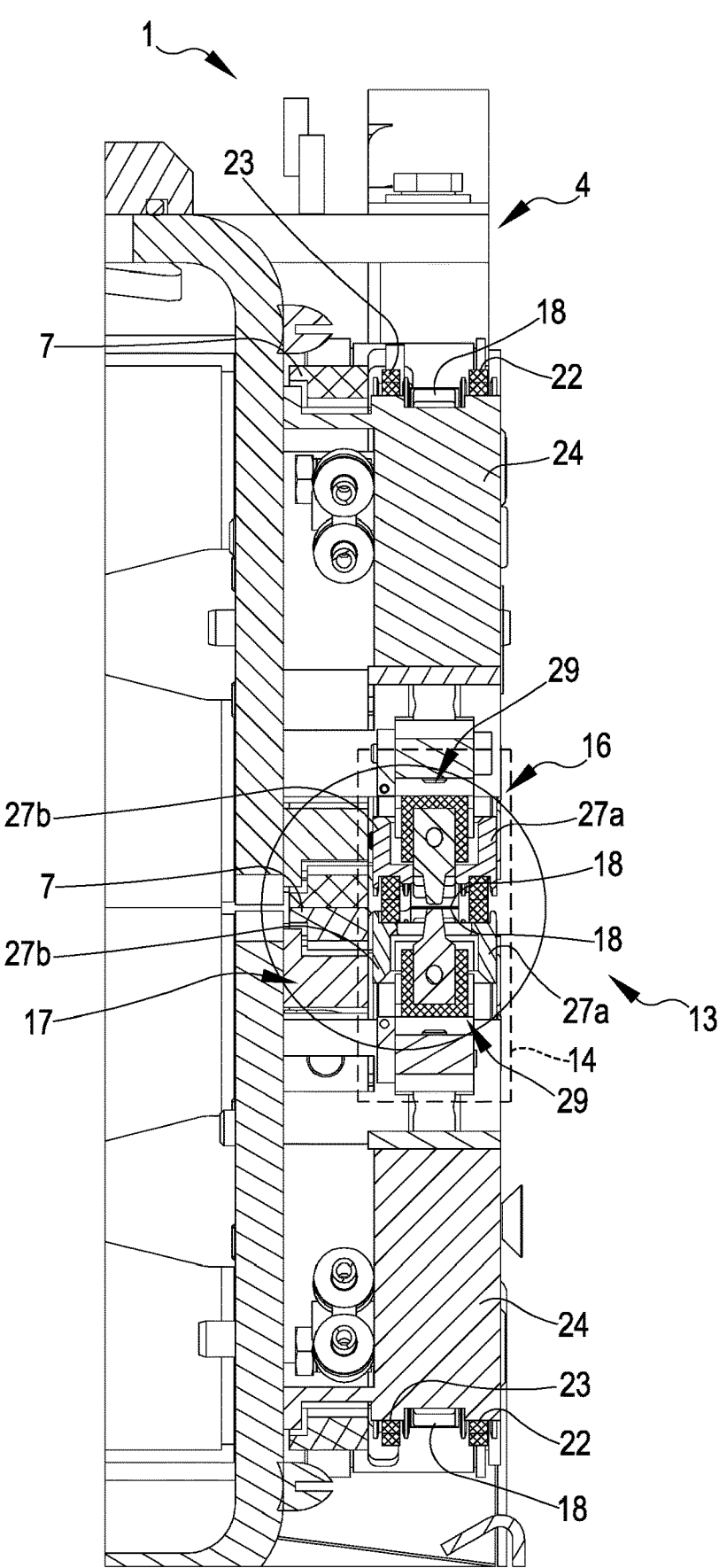
FIG. 4 shows a plane view of the section of FIG. 3 and a relative detail.
Figure 4A:
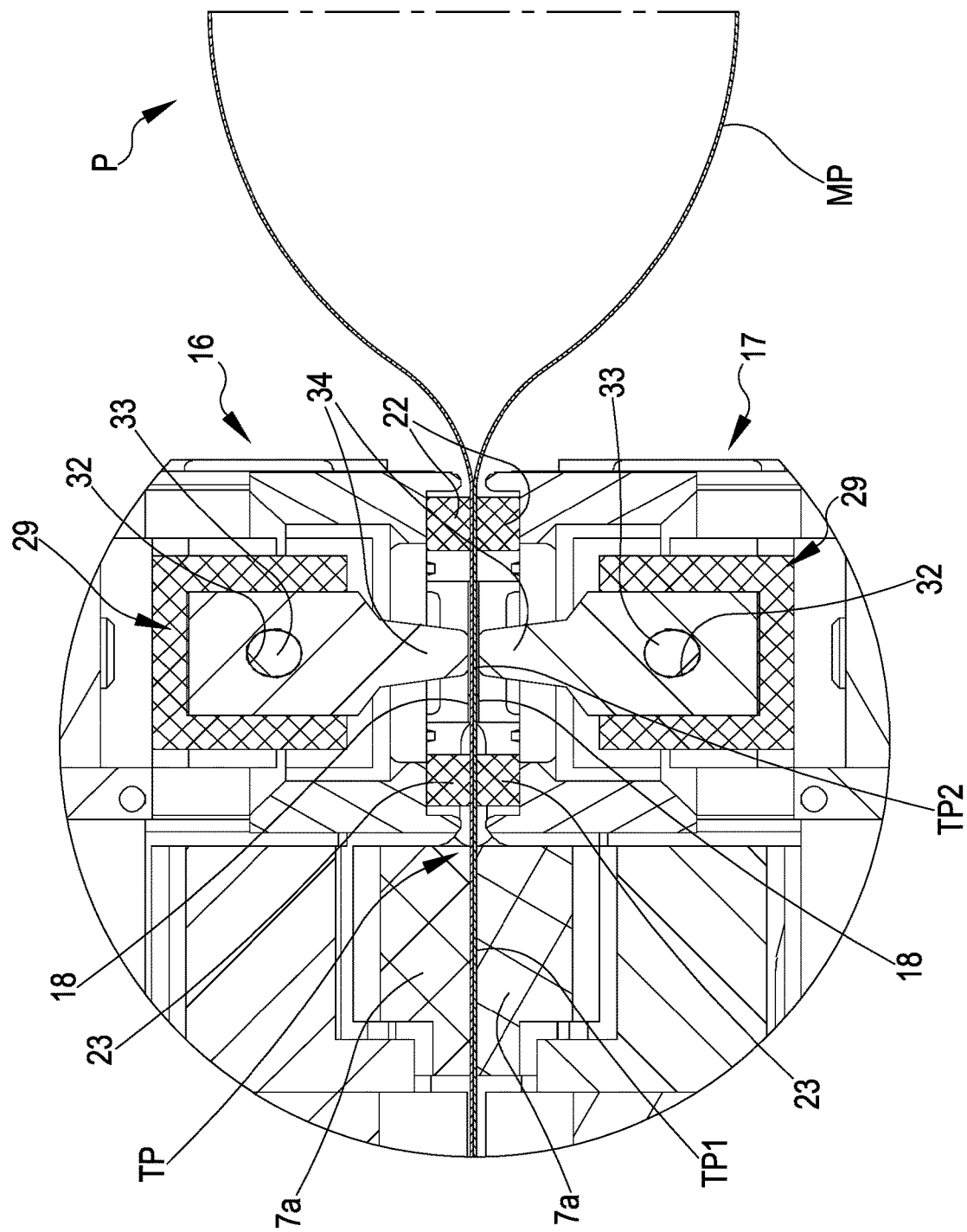
FIG. 4A shows an evacuated package undergoing heat sealing at the heat sealing station of the packaging apparatus of FIG. 4.

The heat sealer module 16, 17 has a heat sealing head 34 designed to contact the terminal portion TP of the evacuated semi-sealed packages P so as to heat seal it. At an end portion of the heat sealing head 34 facing the sealing belt 18 a heat sealing surface is defined. As shown in FIG. 4, the heat sealing head 34 may be integrated in the heat sealing bar 29. That way, the heat sealing head 34 may be movable integral with the heat sealing bar 29. In a possible variant, the heat sealing head 34 is independently movable with respect to the heat sealing bar 29. Heat may be conveyed to the heat sealing head 34, from each heating cartridge 33, by means of the above described heat conveying material of the heat sealing body 29. In operating conditions of the packaging apparatus 1, the sealing belt 18 is interposed between the heat sealing head 34 and the terminal portion TP of the evacuated heat sealed package P passing at the heat sealing station 14.

Downstream the heat sealing body 29 with respect to the main movement direction M, the cooling section 30 is arranged. The cooling section 30 may be located through the passage opening 27c of the pressure element 27. In the preferred embodiment, the cooling section 30 allows naturally cooling, e.g. cooling at least or mainly by natural convection, conduction and/or radiation, of the heat sealed terminal portion TP of the heat sealed packages P. The cooling of the heat sealed terminal portion TP of the heat sealed packages P may be further enhanced sliding the heat sealed terminal portion TP of the heat sealed package P on or below elements (such as a slide or one or more rollers) having a temperature which is lower that the temperature of the heat sealed terminal portion TP. In other words, in the preferred embodiment the cooling section 30 allows cooling the heat sealed terminal portion TP of the heat sealed packages P simply by letting it pass through for a predetermined time period at a controlled speed so as to allow natural cooling. The predetermined time period may be in the order of magnitude of one or few seconds. By letting the heat sealed terminal portion TP of the heat sealed packages P pass through, the cooling section 30 allows the heat sealed terminal portion TP of the heat sealed packages P to dissipate heat. In possible variants, the cooling section 30 may be provided with cooling elements specifically designed for removing heat from the heat sealed terminal portion TP of the heat sealed packages P, thereby accelerating the heat removal from the heat sealed terminal portion TP of the heat sealed packages P. The cooling section 30 may be movable in height at least between an operating position and a rest position. The operating position may be a forward position and the rest position may be a backward position. The forward position and the backward position may be defined with respect to the bottom wall of the longitudinal recess 26. In operating conditions of the packaging apparatus 1, the cooling section 30 in the forward position may apply pressure to the just sealed areas (bands) of the heat sealed packages P, in order to stabilize the seal and flatten the sealing area. The cooling section 30 is configured for applying, in the forward position, a pressure which is lower, same or higher than a pressure applied by the heat sealing body 29 in the forward heat sealing position.

At the cooling section 30 a slide 35 of the heat sealer module 16, 17 is arranged. The slide 35 allows the terminal portion TP of the heat sealed packages P coming from the heat sealing station 14 to pass by and allow cooling of the terminal portion TP of the heat sealed packages P while passing either by removing heat due to contact with the terminal portion (i.e. by heat conduction) or by letting the terminal portion TP dissipate heat by convection and radiation. The slide 35 may also be configured for applying pressure to the terminal portions TP of the heat sealed packages P being processed.

At the cooling section 30 at least a further pressure element 36 of the heat sealer module 16, 17 may be arranged. The further pressure element 36 is configured for applying pressure to the terminal portion TP of the heat sealed packages P. The further pressure element 36 is configured for applying pressure when the cooling section 30 is in the operating position. The further pressure element 36 may be arranged side by side with respect to the slide 35. The cooling station 30 may be provided with a plurality of further pressure elements 36. Each further pressure element may be in the form of a pressure roller 36. The sectioned heat sealing module 17 of FIG. 2 shows a pressure roller 36 arranged at the cooling station 30 adjacent and downstream with respect to the slide 35. The pressure roller 36 is configured for applying a pressure which is lower, same or higher than the pressure applied by the heat sealing body 29 in the forward heat sealing position. The pressure roller 36 may also allow the terminal portion TP of the heat sealed packages P being processed to cool while passing either by removing heat due to contact with the terminal portion TP (i.e. by heat conduction) or by letting the terminal portion TP dissipate heat by convection and radiation.

The heat sealer module 16, 17 may further comprise an additional pulley for the sealing belt 18, indicated as sealing belt pulley 37 in FIG. 2, configured for providing the sealing belt 18 with a longer path compared to the path followed by driving belts 22, 23. As shown in FIG. 2, the sealing belt pulley 37 may be arranged side by side with respect to the first pulley 20 upstream with respect to the main movement direction M. The sealing belt pulley 37 may be in a material having heat transfer properties which are lower than heat transfer properties of the first pulley 20. For example, the sealing belt pulley 37 may be in plastic material. That way, the sealing belt pulley 37 does not dissipate or remove any considerable amount of heat from the sealing belt 18, i.e. the heat transfer from the sealing belt 18 to the sealing drive pulley 37 is negligible.

The heat sealer module 16, 17 further comprises a tensioning device 38 configured for tensioning the sealing belt 18. As shown in FIG. 2, the tensioning device 38 is arranged in proximity of and upstream the first pulley 20 of the heat sealer module 16, 17. The tensioning device 38 is connected to the sealing belt pulley 37 and is movable with respect at least to the first pulley 20 and to the heat sealing body 29. The tensioning device 38 is configured for moving the sealing belt pulley 37 with respect to the heat sealing station 14 and with respect to the first pulley 20 so as to adjust the tensioning of the sealing belt 18.

Figure 6:
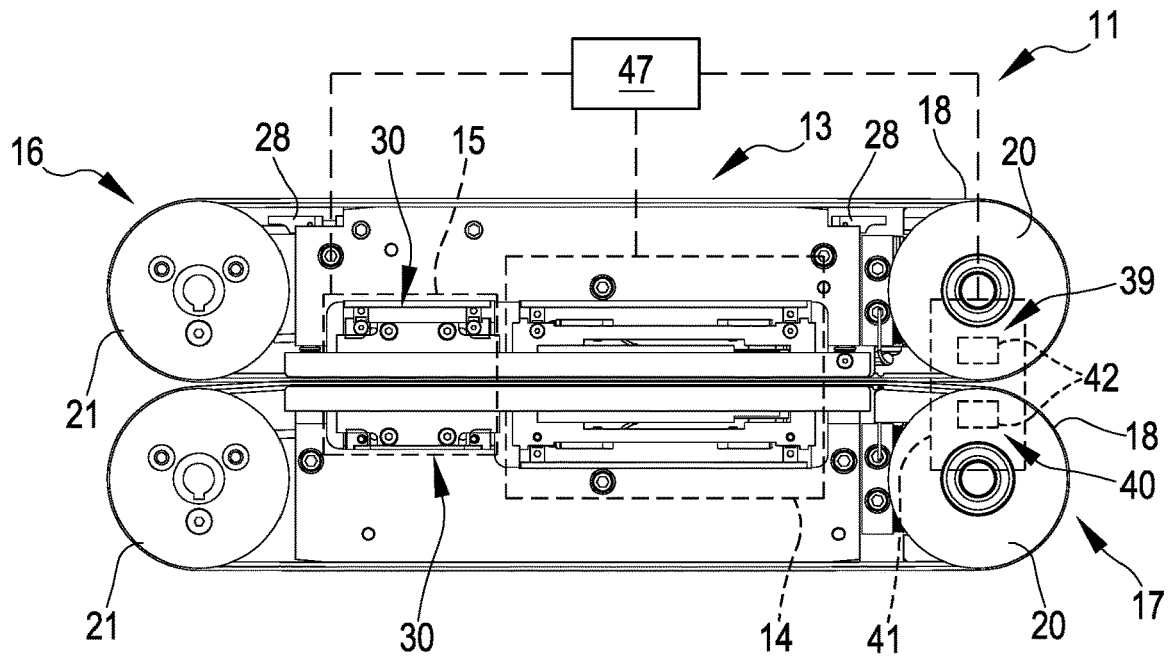
FIG. 6 shows a possible embodiment of the main processing section of the packaging apparatus according to the present invention alternative to the embodiment shown in FIG. 2.

In the embodiment shown in FIG. 6, which is alternative to the embodiment depicted in FIG. 2, the heat sealer module 16, 17 differs from the embodiment of FIG. 2 in that there is no additional sealing belt pulley 37 and thus there is no tensioning device acting on the (absent) sealing belt pulley. In the embodiment of FIG. 6, the sealing belt 18 may be driven by one of the first pulley 20 and the second pulley 21 (as driving belts 22, 23); the tensioning of the sealing belt 18 may not be realized (e.g. only a pre-tensioning of the sealing belt 18 may be realized at the assembling stage of the heat sealer 13 with no further adjustments) or may be realized by adjusting the distance between the first pulley 20 and the second pulley 21 or may be obtained by a tensioning group not shown in FIG. 6. In the embodiment shown in FIG. 6, the first pulley 20 may act as drive pulley for the driving belts 22 and 23 and for the sealing belt 18.

Figure 7:
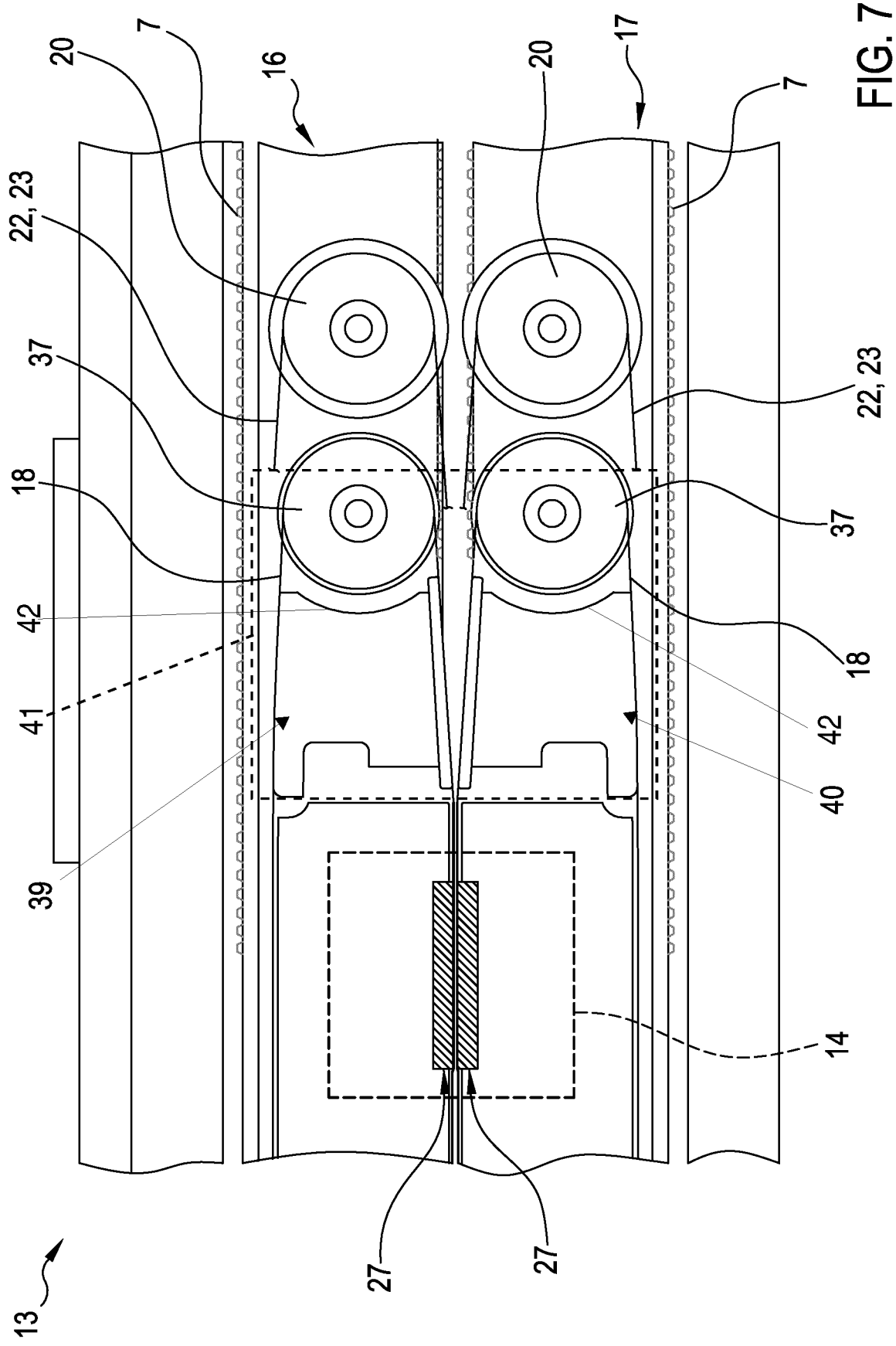
FIG. 7 shows a longitudinal section of the packaging apparatus of FIG. 1 depicting an alternative embodiment of the main processing section of the packaging apparatus.

In the embodiment shown in FIG. 7, which is a further alternative to the embodiment depicted in FIG. 2, the heat sealer module 16, 17 differs from the embodiment of FIG. 2 in that the sealing belt pulley 37 is positioned between the first pulley 20 and the second pulley (not shown in FIG. 7). In the embodiment of FIG. 7, the sealing belt 18 may be driven by the second pulley or by the sealing belt pulley 37, while the first and the second pulley 21 act on driving belts 22, 23; the tensioning of the sealing belt 18 may be obtained by adjusting the distance between the sealing belt pulley and the second pulley 21 or may be obtained by a tensioning group not shown in FIG. 7. In the embodiment shown in FIG. 7, the second pulley (not shown) may act as drive pulley for the driving belts 22 and 23 and for the sealing belt 18.

In addition to the heat sealer 13, at the main processing section a pre-heating unit 39, 40 of the packaging apparatus 1 is located. The pre-heating unit is arranged upstream with respect to the heat sealing station 14. The pre-heating unit 39, 40 is configured for pre-heating at least a band of the terminal portion TP of each evacuated semi-sealed package P.

The pre-heating unit 39, 40 may be integrated in the heat sealer 13 or may be separated from the heat sealer 13. In the embodiment wherein the pre-heating unit 39, 40 is integrated in the heat sealer 13, the first heat sealer module 16 and the second heat sealer module 17 comprise a respective pre-heating unit 39, 40 and hence, being part of a respective heat sealer module 16, 17, both pre-heating units 39, 40 are arranged according to the above described opposed positional relationship with respect to the elongated opening 5. In the embodiment where the pre-heating unit 39, 40 is separated from the heat sealer 13, the packaging apparatus 1 comprises a first pre-heating unit 39 and a second pre-heating unit 40 which are preferably positioned opposed, e.g. symmetrically opposed, with respect to the elongated opening 5. As shown in FIG. 2, in FIG. 6 and in FIG. 7, the pre-heating units 39, 40 face each other and form a pre-heating station 41 of the packaging apparatus 1. In the following, a single pre-heating unit 39, 40 is described as its components and functions are applicable to the other pre-heating unit of the packaging apparatus 1.

Each pre-heating unit 39, 40 is configured for pre-heating a band of the terminal portion TP of each evacuated semi-sealed package P either directly, i.e. by directly pre-heating a band of the terminal portion TP of each evacuated semi-sealed package P either, or indirectly, i.e. by pre-heating a heat conveying tract of the sealing belt 18 designed to come into contact with the band of the terminal portion TP of each evacuated semi-sealed package P. The direct or indirect pre-heating of the terminal portion TP of each evacuated semi-sealed package P may take place at the second band TP2.

The pre-heating unit 39, 40 configured for directly pre-heating a band of the terminal portion TP of each evacuated semi-sealed package P may be provided with one or more heating elements active directly on a band of the terminal portion TP of each evacuated semi-sealed package P crossing the pre-heating unit 39, 40. For example contactless radiating heaters and/or contact heaters may be used.

In the following, possible embodiments of a pre-heating unit 39, 40 configured for indirectly pre-heating a band of the terminal portion TP of each evacuated semi-sealed package P are described.

The pre-heating unit 39, 40 may in this alternative case comprise a pre-heating body 42. With reference to operating conditions of the packaging apparatus 1, the pre-heating body 42 is positioned with respect to the terminal portion TP of the heat sealed package P crossing the pre-heating unit 39, 40 such that the sealing belt 18 is interposed between the plastic material of the terminal portion TP and the pre-heating unit: in this way the sealing belt 18 contacts at least a portion of the pre-heating body 42 and an area of the terminal portion TP of the semi-sealed package P, e.g. at the second band TP2.

According to the embodiments shown in FIGS. 1-5 (see in particular FIG. 3), the pre-heating body 42 is arranged between the sealing belt pulley 37 and the heat sealing station 14. According to possible variants, the pre-heating body 42 may be arranged between the first pulley 20 and the second pulley 21, downstream the second pulley 21 and upstream the first pulley 20, i.e. in the tract of the sealing belt 18 where the sealing belt 18 circulates back towards the first pulley 20. In those variants, the pre-heating body may be arranged in close proximity of the first pulley 20 (i.e., much closer to the first pulley 20 than to the second pulley 21).

The pre-heating body 42 comprises at least one housing 43 and at least one heating cartridge 44 arranged in the housing 43. The pre-heating body 42 is in contact with the sealing belt 18 at least at the portion of the pre-heating body 42 where the heating cartridge 44 is housed. Each heating cartridge 44 of the pre-heating body 42 may be configured for indirectly pre-heating, i.e. pre-heating by means of the heat conveying tract of the sealing belt 37, the material of the terminal portion TP of the evacuated semi-sealed packages P: for example pre-heating may even go up to plastic material softening point. Each heating cartridge 44 of the pre-heating body 42 may hence be configured for at least partially softening the terminal portion TP of the evacuated semi-sealed packages P to be subsequently heat sealed at the heat sealing station 14. Each heating cartridge 44 of the pre-heating body 42 may be chosen or controlled as a function of the material of the semi-sealed packages P. Each heating cartridge 44 of the pre-heating body 42 may be electrically powered.

Figure 5:
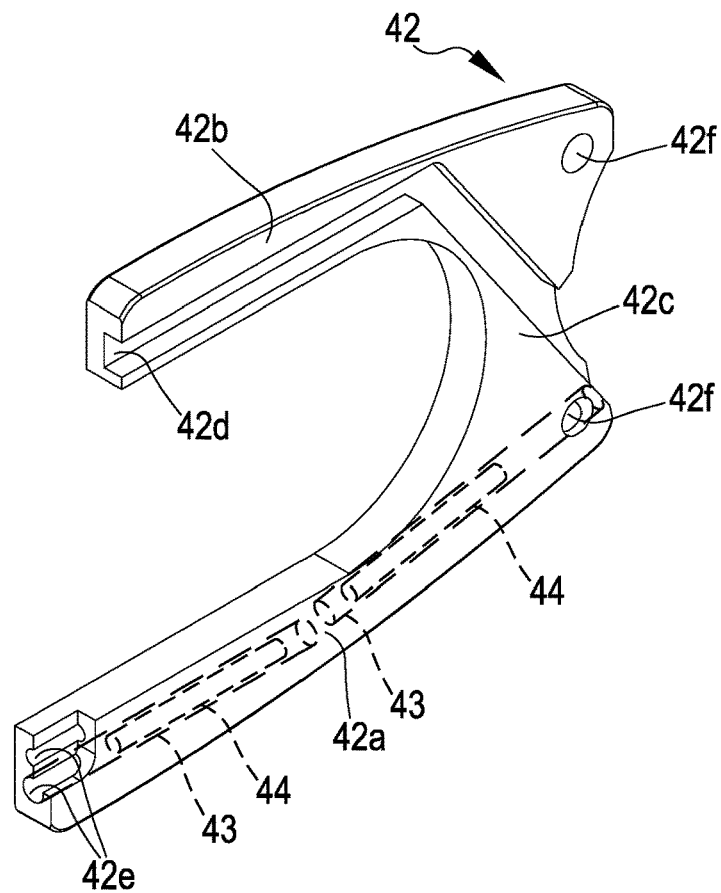
FIG. 5 shows a pre-heating body of the packaging apparatus of FIG. 1.

In the embodiment shown in detail in FIGS. 2-5, the pre-heating body 42 has an overall "C-shape" structure comprising a first arm 42*a*, a second arm 42*b* and a joining portion 42*c* transversal to the first arm 42*a* and the second arm 42*b*. The joining portion 42*c* is arranged between and joins the first arm 42*a* and the second arm 42*b*. The "C-shape" structure of the pre-heating body 42 is shown in FIG. 5, where the pre-heating body 42 has been isolated from the other components of the packaging apparatus 1. At least one heating cartridge is arranged at one or both of the first arm 42*a* and the second arm 42*b*. In FIG. 5 a pre-heating body 42 having a first heating cartridge 44 and a second heating cartridge 44 arranged side by side in respective housings 43 is depicted. Both the first heating cartridge 44 and the second heating cartridge 44 may be arranged at the same arm 42*a*, 42*b* of the pre-heating body 42, such as at the first arm 42*a* of the pre-heating body 42 (see FIG. 5). The first arm 42*a* of the pre-heating unit may be defined as the arm of the pre-heating unit 42 which is arranged in proximity of the elongated opening 5 and faces it. As shown in FIG. 5, the second arm 42*b* and the joining portion 42*c* may have a "C-cross section" defining a "C-shaped" recess 42*d*. The recess 42*d* may be destined for housing one or more wires, e.g. one or more wires designed for electrically powering at least one or both the heating cartridges 44 of the pre-heating body 42. The first arm 42*a* may comprise one or more ports 42*e* for allowing one or more wires to pass through (see FIG. 5). The "C-shaped" pre-heating body 42 may further have one or more through holes 42*f* at which respective constraint elements 45 of the pre-heating unit 39, 40 may be engaged. The constraint elements 45 allow assembling the pre-heating unit with other components of the packaging apparatus (see FIG. 3). In FIG. 5 a "C-shaped" pre-heating body 42 comprising two through holes 42*f* is represented. The through holes 42*f* are located for example at respective opposite ends of the joining portion 42*c* where the joining portion 42*c* connects to the first arm 42*a* and the second arm 42*b*.

As shown in FIG. 2 with reference to the second heat sealer module 17 which has been sectioned, the "C-shaped" pre-heating body 42 may be arranged so as to partially enclose the shaft of the first pulley 20. Such an arrangement of the pre-heating body 42 with respect to the first pulley 20 of respective heat sealer module 16, 17 provides for a compact structure of the pre-heating unit 39, 40 and of the heat sealer modules 16, 17, which occupy a limited overall volume and can therefore be arranged in a limited space, thereby allowing the reduction of the overall dimensions of the packaging apparatus 1.

As shown in FIG. 2 and in FIG. 3, the sealing belt 18 is in contact with the pre-heating body of units 39, 40 both at the first arm 42*a* and at the second arm 42*b* of the pre-heating body 42. With respect to the above described positional arrangement of the pre-heating units 39, 40, it is noted that the sealing belt 18 of the first heating module 16 and the sealing belt 18 of the second heating module 17 are pre-heated by respective pre-heating bodies 42 at respective heat conveying tracts facing each other. The heat conveying tracts at which the sealing belts 18 are pre-heated are the tracts of the heat conveying belt at each instant in contact with the first arm 42*a* of the pre-heating body 42, which is the one where one or more heating cartridges 44 are arranged (see FIG. 3).

In possible embodiments, the pre-heating body 42 may be built-in in the sealing belt pulley 37.

According to a possible embodiment, shown in FIG. 6 and alternative to the one of FIG. 2, the pre-heating body 42 may be built-in in the first pulley 20, which may act as sealing belt drive pulley, although in the currently preferred option the first pulley 20 is driven while the second pulley 21 is driving. The pre-heating body 42 may be built-in in the first pulley 20, for example, by housing a heating cartridge 44 in the first pulley 20. That way, the first pulley 20 itself is pre-heated by means of the built-in pre-heating body 42 and the pre-heated first pulley 20 is configured for pre-heating the sealing belt 18.

In a possible alternative embodiment (not shown in the attached figures), the pre-heating body 42 may be configured for conveying heat to the first pulley 20. Such a pre-heating body 42 may face the first pulley 20 or may be arranged in proximity of the first pulley 20. The pre-heating body 20 may be, for example, a thermal radiating device (e.g. an infrared device) configured for emitting thermal radiations (e.g. infrared radiations). The thermal radiating device may be configured for emitting thermal radiations directioned towards the first pulley 20 thereby conveying heat to the first pulley 20: in other words, the first pulley 20 itself is pre-heated by means of the thermal radiations and the pre-heated first pulley 20 is configured for pre-heating the sealing belt 18. In a possible variant, the thermal radiating device may be configured for emitting thermal radiations having wavelengths apt to pre-heat directly the sealing belt 18.

In the variant of FIG. 7, the pre-heating body 42 of units 39 and 40 is positioned between the second pulley (not shown in FIG. 7) and the belt pulley 37. In detail, the pre-heating body of each of units 39 and 40 pre-heats a respective tract of the heating belt 18, before the belt 18 engages the belt pulley 37 and/or immediately after it has engaged belt pulley 18, but in any case before the heating belt reaches the heat sealing station 14; in particular, the pre-heating body of each of units 39 and 40 pre-heats a respective tract of the heating belt 18, before the belt 18 engages the belt pulley 37 and/or immediately after it has engaged belt pulley 18, but in any case before the heating belt reaches the respective pressure body 27 of the heat sealing station 14.

The pre-heating unit may further comprise at least one pre-heating temperature sensor 46 configured for detecting a pre-heating temperature. The pre-heating temperature sensor 46 may be a thermocouple.

By pre-heating a band of the terminal portion TP of each evacuated semi-sealed package P, the pre-heating unit 39, 40 allows for a proper thermal preparation of the terminal portion TP of the evacuated semi-sealed packages P to the subsequent heat sealing operation which the terminal portion TP will undergo at the heat sealing station 14. Pre-heating the band of the terminal portion TP of each evacuated semi-sealed package P that will subsequently undergo heat sealing at the heat sealing station 14 makes it possible to achieve an efficient heat sealing. In greater detail, the pre-heating unit 39, 40 makes it possible to perform a smoother heat sealing of the terminal portion TP of the evacuated semi-sealed packages P. Additionally, the pre-heating unit 39, 40 reduces the temperature difference, defined at the heat sealing station 14, between the terminal portion TP of the evacuated semi-sealed packages P and the heat sealing body 29, thereby reducing the thermal shock which the terminal portion TP of the evacuated semi-sealed packages P undergoes at the heat sealing station 14, with therefore no risk that the material might deform in an unpredictable manner. Moreover, pre-heat preparation avoids possible risks that during heating phase the material to be sealed might not be uniformly heated, with consequent risk of a bad quality sealing.

The packaging apparatus 1 herein described and claimed and the packaging process described hereinafter and claimed may use at least one control unit 47 configured for receiving signals from the various stations 14, 15, 41, elements, components and/or sensors 19, 46 and for controlling the packaging apparatus 1 or parts thereof and/or for coordinating the execution of the packaging process described hereinafter and claimed.

The control unit may 47 be a single unit (centralized or not) or be formed by a plurality of distinct control units depending on the design choices and operational needs.

The term control unit is in any case understood as a component of electronic type which may include at least one of: a digital processor (CPU), an analog circuit, or a combination of one or more digital processors with one or more circuits of analog type. The control unit 47 may be "configured" or "programmed" to perform certain operations of the packaging apparatus 1 or steps of the packaging process—this can be achieved in practice by any means that allow to configure or program the control unit 47. For example, in the case of a control unit 47 comprising one or more CPUs and one or more memories, one or more programs may be stored in appropriate memory banks connected to the CPU or CPUs. The program(s) (software or firmware, for example) contain instructions which, when executed by the CPU(s), program or configure the control unit 47 to perform the operations of the packaging apparatus 1 described hereinafter or claimed in relation to the control unit 47 itself. These programs can be written in any known programming language. If the number of CPUs is two or more, they can be connected to each other by means of a data connection so that their computing powers are shared. The CPUs themselves may be installed in geographically different locations (e.g. remote CPUs), creating a distributed computing environment through the data connection mentioned above. The CPU(s) may be a general purpose processor configured for executing one or more operations of the packaging apparatus 1 or steps of the packaging process described hereinafter or claimed. The memory medium may be non-transitory and may be internal or external to the CPU(s) and may—specifically—be a memory located geographically remote from the computer. The memory medium may be physically divided into several portions, or in the form of a "cloud", and the software or firmware program can provide portions stored on geographically divided portions of memory. Alternatively, if the control unit 47 is, or includes, analogue circuitry, then the control unit circuit may be designed to include circuitry configured, in use, to process electrical signals in such a way as to perform the control unit 47 steps, operations or procedures described hereinafter or claimed.

The control unit 47 may be configured for implementing and monitoring all operations of the packaging apparatus 1, such as all operations of procedures hereinafter described to be carried out by the packaging apparatus 1, and for implementing and monitoring all steps of the packaging process described hereinafter.

Whenever the control unit 47 is described as being communicatively connected with at least one element, one component, one station or one section of the packaging apparatus 1 it is understood that the control unit 47 is connected to it so as to exchange (receive and/or send) with it at least a piece of information or at least an instruction in any form, e.g. in form of data such as data packets. In greater detail, the communicative connection of the control unit 47 allows the control unit 47 to control, supervise and manage the elements, components, stations and sections which it is communicatively connected to.

First of all, the control unit 47 may be configured for moving the vacuum chamber 4 at a specific height with respect to the conveyor 8 as a function of at least one dimension of the semi-sealed packages P to be packaged (i.e. to be packaged by heat sealing) or of at least one dimension of the one or more products housed inside the semi-sealed packages P. The control unit 47 may move the vacuum chamber 4 according to the following positioning procedure. In order to move the vacuum chamber 4, the control unit 47 may control the movement means which it is communicatively connected with. The positioning procedure provides for receiving an information relating to at least one dimension of the semi-sealed packages P or to the product housed therein (for example from a user interface connected with the control unit 47) of for identifying at least one dimension of the semi-sealed packages P to be packaged or at least one dimension of the one or more products housed inside the semi-sealed packages P and for setting the vacuum chamber 4 at a specific height with respect to the conveyor 8 as a function of the identified dimension of the semi-sealed package P or of one or more products housed inside the semi-sealed package P. The positioning procedure may be part of a preparation operation of the packaging apparatus 1 which precedes the operating conditions of the packaging apparatus 1 in which semi-sealed packages P are fed to the conveyor 8.

With reference to a feeding operation of the semi-sealed packages P, the control unit 47 is configured for managing the advancement of the semi-sealed packages P along the main movement direction M throughout the packaging apparatus 1. In order to manage this phase, the control unit 47 is communicatively connected with the guide belt 7, with the sealing belt 18 and with the conveyor 8. In order to allow an effective advancement of the semi-sealed packages P throughout the packaging apparatus 1, the control unit 47 is configured for moving the guide belt 7, the sealing belt 18 and the conveyor 8 in synchrony and approximately at the same speed. Thus, the semi-sealed packages P received from the loading station 2 are maintained at a predefined or desired orientation with respect to the vacuum chamber 4, therefore allowing an effective evacuation and heat sealing of the packages P. The control unit 47 may also be communicatively connected the one of the first pulley 20 and the second pulley 21 (i.e. to the drive pulley) and may be configured for driving the pulleys 20, 21 at a rotational speed allowing the first driving belt 22 and the second driving belt 23 to have a speed which is approximately the same speed as that of the guide belt 7, the sealing belt 18 and the conveyor 8.

The control unit 47 is also configured for managing a sealing procedure of the semi-sealed packages P. In order to implement the sealing procedure, the control unit 47 is communicatively connected also with the pre-heating section 41, e.g. at least with one pre-heating body 42 of one or both the pre-heating units 39, 40, and with the heat sealing station 14, e.g. at least with one heat sealing body 29 of one or both the heat sealing modules 16, 17. The sealing procedure provides for setting the pre-heating temperature and the heat sealing temperature.

With respect to the pre-heating temperature, the control unit 47 may set or may allow setting of absolute values of a minimum pre-heating temperature and a maximum pre-heating temperature, e.g. respectively 100° C. and 140° C., and may hence define a pre-heating temperature range, e.g. ranging from 100° C. to 140° C. The pre-heating temperature may be around 120° C. Different pre-heating temperatures may be set by the control unit 47 as a function of the material of the semi-sealed packages P. The pre-heating temperature or the pre-heating temperature range may be calibrated so as to include the softening point of the material of the semi-sealed packages P.

The control unit 47 may be configured for setting the pre-heating temperature as a function of at least one of an internal vacuum pressure defined in at least a portion of the vacuum chamber 4 or a temperature of the terminal portion TP of the evacuated semi-sealed packages P located upstream or at the pre-heating unit 39, 40. It is to be noted that the temperature of the terminal portion TP of the evacuated semi-sealed packages P located upstream or at the pre-heating unit 39, 40 is a function of the evacuation operation by means of the evacuation means 9 which has taken place upstream or at the pre-heating unit 39, 40. Indeed, the evacuation operation of the semi-sealed packages P lowers the temperature of the semi-sealed packages P, and more specifically at least the temperature of the plastic material of terminal portion TP through which the evacuated gas flows out from an inner volume of semi-sealed the packages P.

In view of the above, setting the pre-heating temperature as a function of one of an internal vacuum pressure defined in at least a portion of the vacuum chamber 4 or of a temperature of the terminal portion TP of the evacuated semi-sealed packages P located upstream or at the pre-heating unit 39, 40 is effective and advantageous as it allows to pre-heat the terminal portion TP of the evacuated semi-sealed packages P at the right pre-heating temperature, i.e. without the need of reaching higher than necessary temperatures, therefore pre-heating the terminal portion TP of the evacuated semi-sealed packages P as desired while optimizing and reducing the consumption, e.g. the electrical consumption, of the packaging apparatus 1.

Additionally or alternatively, the control unit 47 may be configured for setting the pre-heating temperature as a function of a residual target pressure of the evacuated semi-sealed packages P or of the heat sealed packages P or of at least one dimension of the semi-sealed packages P to be packaged, such as the thickness of the material of the semi-sealed package P defined at the terminal portion TP of the semi-sealed package P, or of at least one dimension of the one or more products housed inside the semi-sealed packages P. In view of the above setting options, the pre-heating temperature can be calibrated by the control unit 47 as appropriate.

With respect to the heat sealing temperature, the control unit 47 may set absolute values of a minimum heat sealing temperature and a maximum heat sealing temperature, e.g. respectively 160° C. and 240° C., and may hence define a heat sealing temperature range, e.g. ranging from 160° C. to 240° C. The heat sealing temperature may be around 200° C. Different heat sealing temperatures may be set by the control unit 47 as a function of the material of the semi-sealed packages P. The heat sealing temperature or the heat sealing temperature range may be calibrated so as to include the melting point of the material of the semi-sealed packages P.

After setting or a allow setting via a user interface of the pre-heating temperature or a pre-heating temperature range and the heat sealing temperature or a heat sealing temperature range, the control unit 47 may drive the conveyor 8 so as to guide at least the terminal portion TP of the semi-sealed packages P through the elongated opening 5 of the vacuum chamber 4 parallel to the longitudinal axis L of the vacuum chamber 4 up to the pre-heating unit 39, 40.

Then, as part of the sealing procedure, the control unit 47 may be configured for controlling the pre-heating unit 39, 40 to pre-heat, by means of the one or more heating cartridges 44 housed in the pre-heating body 42, at least a band of the terminal portion TP of each evacuated semi-sealed package P at the pre-heating temperature while the conveyor 8 moves the terminal portion TP of each evacuated semi-sealed package P parallel to the longitudinal axis L of the vacuum chamber 4. In other words, the control unit 47 is configured for controlling the pre-heating unit 39, 40 to pre-heat a heat conveying tract of the sealing belt 18 so as to indirectly pre-heat a band of the terminal portion TP of each semi-sealed package P (e.g. the second band TP2 of the terminal portion TP as described above) while commanding movement of the sealing belt 18 and the conveyor 8. The control unit 47 is hence configured for controlling the pre-heating unit 39, 40 to pre-heat the terminal portion TP of each semi-sealed package P (as previously described) while continuously causing movement of the conveyor 8 and of the sealing belt 18 thus determining displacement of the processed semi-sealed packages P throughout pre-heating unit 39, 40. In the embodiment of the packaging apparatus 1 which is equipped also with the guide belt(s), the control unit 47 may also continuously cause movement, at the same time, of the guide belt 7 such that an active portion of it continuously displaces along the longitudinal axis L of the vacuum chamber 4. The above mentioned control of the pre-heating unit 39, 40 is performed by the control unit 47 by controlling, e.g. by adjusting, the electrical power supplied to the heating cartridge(s) 44 of the pre-heating body 39, 40. In the pre-heating operation, the control unit 47 may be configured for controlling the pre-heating body 42 to reach the softening point of the material of the semi-sealed packages P.

The control unit 47 is further configured for driving the conveyor 8 and the sealing belt 18 so as to guide at least the pre-heated terminal portion TP of the evacuated semi-sealed packages P through the elongated opening 5 of the vacuum chamber 4 along the longitudinal axis L of the vacuum chamber 4 from the pre-heating unit 39, 40 to the heat sealing station 14.

The control unit 47 is further configured for controlling the heat sealing station 14 to heat seal the pre-heated terminal portion TP of each evacuated semi-sealed package P at the heat sealing temperature thereby forming heat sealed packages P while the conveyor 8 and the sealing belt 18 move the terminal portion TP of the evacuated semi-sealed package P along the longitudinal axis L of the vacuum chamber 4. The above mentioned control of the heat sealing station 14 is performed by the control unit 47 by controlling, e.g. by adjusting, the electrical power supplied to the heating cartridge(s) 33 of the heat sealing body 29. The control unit 47 is hence configured for controlling the heat sealing station 14 to heat seal the terminal portion TP of each evacuated semi-sealed package P (as previously described) while continuously causing motion of the conveyor 8 and the sealing belt 18. In the embodiment of the packaging apparatus 1 which is equipped also with the guide belt, the control unit 47 may continuously cause a synchronous movement of the guide belt 7, whereby an active portion of this latter displaces along the longitudinal axis L of the vacuum chamber 4.

In the heat sealing operation, the control unit 47 is configured for controlling the heat sealing body 29 to reach the melting point of the material of the semi-sealed packages P. In order to perform the heat sealing operation, the control unit 47 is further configured for determining motion of the heat sealing body 29 towards the terminal portion TP of the evacuated semi-sealed packages P. The control unit 47 is configured for controlling the movement of the heat sealing body 29 so as to make the heat sealing head 34 contacting the sealing belt 18 arranged above the terminal portion TP of the evacuated semi-sealed packages P to be heat sealed.

The control unit 47 is also configured for monitoring the pre-heating temperature, as hereinafter described, by means of a pre-heating temperature monitoring procedure. In order to monitor the pre-heating temperature, the control unit 47 is communicatively connected with the pre-heating temperature sensor 46 of the pre-heating unit 39, 40. The pre-heating temperature monitoring procedure may be part of the above described sealing procedure.

The pre-heating temperature monitoring procedure provides for the detection of an actual temperature of the pre-heating unit or of the sealing belt 18. An actual temperature of the pre-heating unit 39, 40 may be a temperature which is defined at or in proximity of the pre-heating unit 39, 40 and is function of the amount of heat generated by the heating cartridge(s) 44 of the pre-heating body 39, 40. After detecting the actual temperature, the control unit 47 is configured for comparing the detected actual temperature with the set pre-heating temperature or pre-heating temperature range so as to perceive a possible deviation of the actual temperature with respect to the set pre-heating temperature or pre-heating temperature range. In case a deviation between the detected actual temperature and the set pre-heating temperature is uncovered, the control unit 47 controls the pre-heating unit 39, 40 so as to adjust the actual temperature to get it closer to the set pre-heating temperature.

The control unit 47 may adjust the actual temperature only in case the deviation perceived is a considerable deviation, i.e. a deviation which is larger than a pre-set deviation threshold. Deviations of the actual temperature below the pre-set deviation threshold may be tolerated. The adjustment of the actual temperature may be performed by adjusting the electrical power supplied to the heating cartridge(s) 44 of the pre-heating body 39, 40. The following adjustments may be performed by the control unit 47 on the pre-heating unit 39, 40. In case the actual temperature detected by the pre-heating temperature sensor is higher than the set pre-heating temperature, the control unit 47 may command de-energization, e.g. temporarily de-energize, at least one heating cartridge 44 of the pre-heating body 39, 40 so as to make the actual temperature decrease. Conversely, in case the actual temperature detected by the pre-heating temperature sensor 46 is lower than the set pre-heating temperature, the control unit 47 may energize, e.g. temporarily energize, at least one heating cartridge 44 of the of the pre-heating body 39, 40 so as to make the actual temperature increase.

The control unit 47 is also configured for monitoring the heat sealing temperature, as hereinafter described, by means of a heat sealing temperature monitoring procedure. In order to monitor the heat sealing temperature, the control unit 47 is communicatively connected with the at least one heat sealing temperature sensor 19 of the heat sealing station 14. The heat sealing temperature monitoring procedure may be part of the above described sealing procedure.

The heat sealing temperature monitoring procedure provides for the detection of an actual temperature of the heat sealing station 14 or of the sealing belt 18. An actual temperature of the heat sealing station 14 may be a temperature which is defined at or in proximity of the heat sealing station 14 and is function of the amount of heat generated by the heating cartridge(s) 33 of the heat sealing body 29. After detecting the actual temperature, the control unit 47 is configured for comparing the detected actual temperature with the set heat sealing temperature or heat sealing temperature range so as to perceive a possible deviation of the detected actual temperature with respect to the set heat sealing temperature or heat sealing temperature range. In case a deviation of the detected actual temperature with respect to the set heat sealing temperature is perceived, the control unit 47 controls the heat sealing station 14 so as to adjust the actual temperature to get it closer to the set heat sealing temperature.

The control unit 47 may adjust the actual temperature only in case the deviation perceived is a considerable deviation, i.e. a deviation which is larger than a pre-set deviation threshold. Deviations of the actual temperature below the pre-set deviation threshold may be tolerated. The adjustment of the actual temperature may be performed by adjusting the electrical power supplied to the heating cartridge(s) of the heat sealing body 29. The following adjustments may be performed by the control unit 47 on the heat sealing station. In case the actual temperature detected by the heat sealing temperature sensor 19 is higher than the set heat sealing temperature, the control unit 47 may de-energize, e.g. temporarily de-energize, at least one heating cartridge 33 of the of the heat sealing body 29 so as to make the actual temperature decrease. Conversely, in case the actual temperature detected by the heat sealing temperature sensor 19 is lower than the set heat sealing temperature, the control unit 47 may energize, e.g. temporarily energize, at least one heating cartridge 33 of the of the heat sealing body 29 so as to make the actual temperature increase.

The control unit 47 is further communicatively connected with the evacuation means 9. In order to allow the formation of evacuated semi-sealed packages P, while implementing the sealing procedure the control unit 47 is configured for controlling the evacuation means 9 to evacuate the vacuum chamber 4, e.g. throughout the duct 10.

After having controlled the pre-heating and the heat sealing of the terminal portion TP of each package P, thereby supervising the packaging process implemented by the packaging apparatus 1 and aimed at obtaining heat sealed packages P, the control unit 47 may also control the removal of the waste portion from the heat sealed package P. In order to control the removal of the waste portion, the control unit 47 is communicatively connected with the waste removal station 12. The control unit 47 controls the waste removal station 12 to remove the waste portion of the heat sealed package P. The control unit may control the waste removal station 12 to remove the waste portion by commanding a cutting operation, which may be executed e.g. by means of one of the previously described cutting tools.

The packaging apparatus 1 may also comprise a display device 48, which may be in the form of a display screen (see FIG. 1). The display device 48 is communicatively connected with the control unit 47. The display device 48 may be configured for displaying information relative to parameters of the heat sealer 13 or of the pre-heating units 39, 40, such as actual or desired pre-hating temperatures and actual or desired heat sealing temperatures. The display device 48 may also be configured for displaying information relative to the procedures, such as the positioning procedure, the sealing procedure and the pre-heating and heat sealing temperature monitoring procedures, implemented by the control unit 47.

The packaging apparatus 1 may also comprise one or more input elements 49 communicatively connected to the control unit 47. The input elements may be configured for setting at least one of the above defined parameters or inputting parameters or instructions to the control unit 47.

The control unit 47, the display device 48 and the input elements 49 may be integrated in a single device 50 of the packaging apparatus 1 or may be separated from each other.

The present invention relates also to a packaging process. The packaging process is aimed at heat sealing semi-sealed packages P as having the previously described structure, i.e. having a terminal portion TP with at least one open end and a main portion housing MP one or more products. The packaging process may comprise the steps described below.

The steps of the packaging process may be implemented or monitored by the above described control unit 47 on the packaging apparatus 1 described above. The steps of the packaging process may be implemented by corresponding elements, components, stations and sections of the packaging apparatus 1 having corresponding functions. When considering the steps of the packaging process as implemented by the packaging apparatus 1, due account of the above described modularity and positional relationship of elements, components, stations and sections of the packaging apparatus 1 is to be taken.

First of all, the packaging process may include a preparation step wherein the vacuum chamber 4 is appropriately positioned with respect to the conveyor 8. In greater detail, the vacuum chamber 4 may hence be set at a specific height with respect to the conveyor 8. The height which the vacuum chamber 4, and hence its bottleneck portion 6 are positioned, may be a function of at least one dimension of the semi-sealed packages P to be packaged or of one or more products housed inside the semi-sealed packages P.

The packaging process provides for arranging semi-sealed packages P on the loading station 2 and then feeding the semi-sealed packages P to the conveyor 8. Alternatively, the packaging process provides for arranging the semi-sealed packages P directly on the conveyor 8. The semi-sealed packages are fed or arranged on the conveyor 8 with a predefined or desired orientation according to which the open terminal portion TP of the semi-sealed packages P is positioned laterally on a specific side of the conveyor 8 with respect to the main movement direction M. The predefined or desired orientation provides for the open end of the terminal portion TP of each semi-sealed package P, i.e. an unsealed portion of the semi-sealed package P, being positioned facing towards the side of the conveyor 8 at which the vacuum chamber 4 is located (e.g. towards the right with respect to the main movement direction M shown in FIG. 1).

The semi-sealed packages P may be loaded in the loading station 2 already in the predefined or desired orientation or may be rearranged at the loading station 2 so as to take the predefined or desired orientation.

The semi-sealed packages P to be heat sealed at their terminal portion TP are fed to the bottleneck portion 6 of the vacuum chamber 4 and then move along the vacuum chamber 4.

The packaging process provides for moving the semi-sealed packages P along the above described main movement direction M. The main movement direction M is defined as a main advancement direction of the packages P along the packaging apparatus 1. The movement of the packages P is performed continuously throughout the packaging apparatus 1, from the inlet section 5a to the outlet section 5b of the elongated opening 5. The movement of the semi-sealed packages P throughout the packaging apparatus 1 is performed by means of the guide belt(s) 7, which receives the semi-sealed packages P by the loading station 2, feeds them to the bottleneck portion 6 of the vacuum chamber 4 and moves them past the bottleneck portion 6 of the vacuum chamber 4. By moving the semi-sealed packages past the bottleneck portion 6, the guide belt 7 lets the semi-sealed packages P enter the elongated opening 5 at the inlet section 5a and continuously moves them up to the outlet section 5b of the elongated opening 5.

The movement of the semi-sealed packages P is performed also with the aid of the conveyor 8 as described in relation to the packaging apparatus 1. While the guide belt 7 contacts the semi-sealed package P at the first band TP1 of the terminal portion TP, the conveyor 8 is active and transports the main portion MP of the semi-sealed packages. The conveyor 8 is also responsible to move the packages P all along the packaging apparatus 1 by moving, after sealing, the main portion MP of the packages P outside the vacuum chamber 4 along the main movement direction M which is parallel to the longitudinal axis L of the vacuum chamber 4 (see FIG. 1). As described with reference to the packaging apparatus 1, the movement of the packages P and in particular the accurate displacement and positioning of the terminal portions TP relative to heat sealer 13 is further performed by the sealing belt 18 which contacts the terminal portion TP of the packages P at the second band TP2 and guides the terminal portion TP of the packages P throughout the heat sealer 13, i.e. moves the terminal portion TP of the packages P at least from the pre-heating unit 39, 40, through the heat sealing station 14, up to the cooling station 15.

The movement of the heat sealed packages P downstream the cooling station 15 is performed by the conveyor 8 and by the guide belt 7. The movement of the packages P along the main movement direction M and along the elongated opening 5 is a continuous movement and is performed, as described, by endless belts (guide belt 7, sealing belt 18, conveyor 8). As described above with reference to the possible variant of the packaging apparatus 1 devoid of guide belt 7, the packaging process may provide for moving the packages P along the main movement direction only using the conveyor 8 and of the sealing belt 18.

While moving the semi-sealed packages P along the main movement direction M, gas present in the semi-sealed packages P is evacuated from the inner volume of the semi-sealed packages P, thereby forming evacuated heat sealed packages P. The evacuation of gas is performed by the evacuation means 9 and may be a progressive evacuation of gas. The progressive evacuation of gas may be performed by means of the vacuum chamber 4 described above, having portions whose respective internal vacuum pressures may diminish proceeding along the main movement direction M.

By means of the guide belt 7, the sealing belt 18 and the conveyor 8, the terminal portion TP of the evacuated semi-sealed packages P is fed to the pre-heating unit 39, 40. At the pre-heating unit, at least a band of the terminal portion TP of each evacuated semi-sealed package P is pre-heated. As described in relation to the packaging apparatus 1, the pre-heating is performed at the pre-heating temperature.

The packaging process may include monitoring the pre-heating temperature according to the operations described above in relation to the pre-heating temperature monitoring procedure controlled by the control unit 47. The actual temperature defined at or in proximity of the pre-heating unit may be monitored and the heating cartridge(s) 44 of the pre-heating body 42 may be energized or de-energized according to the actual temperature being respectively lower or higher than the set pre-heating temperature. The pre-heating temperature may be monitored, continuously or intermittently, before pre-heating or while pre-heating or both before and while pre-heating.

The pre-heating step may be performed by directly pre-heating the terminal portion TP of the evacuated semi-sealed packages P or by indirectly pre-heating the terminal portion TP of the evacuated semi-sealed packages P, i.e. by pre-heating a heat conveying tract of the sealing belt 18 and then pre-heating, by means of the pre-heated heat conveying tract, a band of the terminal portion TP of each evacuated semi-sealed package P.

In the embodiments wherein the terminal portion TP of the evacuated semi-sealed packages P is indirectly pre-heated, the pre-heating of the band of the terminal portion TP of each evacuated semi-sealed package P is performed by the heat conveying tract of the sealing belt 18 contacting the band of the terminal portion TP of each evacuated semi-sealed package P. The band contacted by the heat conveying tract, which is hence pre-heated, is the second band TP2 of the terminal portion TP; during pre-heating of the second band TP2, the heat conveying tract of the sealing belt 18 is interposed between the pre-heating body 42 and the plastic material of the semi-sealed package P at the second band TP2 of the terminal portion TP.

In greater detail, the heat conveying tract of the sealing belt 18 is interposed between the first arm of the "C-shaped" pre-heating body 42 comprising the heating cartridge(s) 44 and the second band TP2 of the terminal portion TP of the evacuated semi-sealed packages P to be pre-heated (embodiment of FIGS. 1-5). In another embodiment, the heat conveying tract of the sealing belt 18 is interposed between a portion of the pulley 20, 21 in which the heating body 42 and hence the cartridge(s) 44 are built-in and the second band TP2 of the terminal portion TP of the evacuated semi-sealed packages P to be pre-heated (embodiment of FIG. 6).

After pre-heating the second band TP2 of the terminal portion TP of the evacuated semi-sealed packages P, the packaging process provides for heat sealing the pre-heated terminal portion TP of the evacuated semi-sealed packages P. The pre-heated band of the terminal portion TP of the evacuated semi-sealed packages P is moved, as described above, from the pre-heating unit 39, 40 to the heat sealing station 14, in at least one embodiment also by means of the sealing belt 18. The heat sealing takes place at the previously pre-heated second band TP2 of the terminal portion TP of the evacuated semi-sealed packages P. The heat sealing step is basically a step wherein the open end of the terminal portion TP of the semi-sealed packages P is sealingly closed, thereby constraining the product or products housed inside the main portion MP of the heat sealed package P in the inner volume of the heat sealed packages P which is not anymore in contact with the environment outside the package P. The heat sealing step of the packaging process may be performed as described above in relation to the packaging apparatus 1.

During the heat sealing step, pressure is applied to the terminal portion TP of the evacuated semi-sealed packages P, at least at the second band TP2. Pressure may be applied by the above described pressure element 27.

The packaging process may include monitoring the heat sealing temperature according to the operations described above in relation to the heat sealing temperature monitoring procedure controlled by the control unit 47. The actual temperature defined at or in proximity of the heat sealing station 14 may be monitored and the heating cartridge(s) 33 of the heat sealing body 29 may be energized or de-energized according to the actual temperature being respectively lower or higher than the set heat sealing temperature. The heat sealing temperature may be monitored, continuously or intermittently, before heat sealing or while heat sealing or both before and while heat sealing.

While heat sealing the previously pre-heated terminal portion TP of the evacuated semi-sealed packages P, the sealing belt 18 is interposed between the heat sealing body 29 and the previously pre-heated terminal portion TP of the evacuated semi-sealed packages P undergoing heat sealing. In greater detail and with reference to the modularity of the heat sealer 13, while heat sealing, the previously pre-heated terminal portion TP of the evacuated semi-sealed packages P is arranged at a gap defined between facing surfaces of the sealing belt 18 of the first heat sealer module 16 and the sealing belt 18 of the second heat sealer module 17 (see FIG. 4A). As shown in FIG. 4, each sealing belt 18 of the first heat sealer module 16 and of the second heat sealer module 17 is in contact with, at an opposite surface with respect to the surface facing the above mentioned gap, a respective heat sealer head 34 of the heat sealing body 29.

After heat sealing, the packaging process provides for cooling the terminal portion TP of the heat sealed packages P. The cooling step of the terminal portion TP of the heat sealed packages P allows cooling at least of the second band TP2 of the terminal portion TP which has been previously heat sealed.

During the cooling step, pressure is applied to the terminal portion TP of the evacuated semi-sealed packages P, at least at the second band TP2. Pressure may be applied by the above described further pressure element 36, such as the above described pressure roller.

The cooling step may include passing the terminal portion TP of the heat sealed packages P by the slide 35. While cooling takes place, pressure may be applied to the terminal portion TP of the heat sealed packages P by the slide 35.

After the cooling step, a waste portion of the terminal portion TP of the heat sealed packages P may be removed. The removal step may be performed by means of the waste removal station 12 described above with reference to the packaging apparatus 1. The removal step may be performed by cutting the waste portion, e.g. by cutting it by means of the cutting tool.

Following the removal step, the terminal portion TP of heat sealed packages P in finished form exit the vacuum chamber 4 at the outlet section 5*b* of the elongated opening 5. Note that alternatively, the removal step may take place after the heat sealed package P has left the vacuum chamber 4.

After the heat sealed packages P exit the vacuum chamber 4, the heat sealed packages P are collected, e.g. for further processing such as labeling. The collection may take place at an unloading station of the packaging apparatus 1.

The packaging process may include visualizing (on display 48) information relative to one or more operations of the packaging procedures (e.g., one or more of the positioning procedure, the sealing procedure, the pre-heating and heat sealing temperature monitoring procedure) and/or information relating to one or more parameters of the packaging process, such as actual or desired pre-hating temperatures and/or actual or desired heat sealing temperatures.

Throughout the packaging process, information or instructions may be inputted to the packaging apparatus 1 by means of the one or more input elements 49. Also, one or more of the above described parameters of the packaging process may be set by means of the input elements 49 communicatively connected to the control unit 47.

The packaging process may hence be controlled by a single device 50 including the control unit 47, the display device 48 and the input elements 49.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. A packaging apparatus (1) comprising:
a vacuum chamber (4) having an elongated opening (5) extending along or parallel to a longitudinal axis (L) of the vacuum chamber (4),
a conveyor (8) configured for receiving semi-sealed packages (P), each one of the semi-sealed packages (P) having a terminal portion (TP) with at least one opening and a main portion (MP) housing one or more products, the conveyor (8) being further configured for moving the semi-sealed packages (P) relative to the vacuum chamber (4) along a main movement direction (M) such that each semi-sealed package (P) positioned on the conveyor (8) may have, during the relative movement of the semi-sealed package (P) with respect to the vacuum chamber (4), the terminal portion (TP) passing through the elongated opening (5) with its opening relatively moving within the vacuum chamber (4), while the main portion (MP) relatively moves outside the vacuum chamber (4),
evacuation means (9) fluidly communicating with the vacuum chamber (4) and configured for providing the vacuum chamber (4) with an internal vacuum pressure that is lower than an ambient pressure outside the vacuum chamber (4) thereby evacuating gas present in the semi-sealed packages (P) and forming evacuated semi-sealed packages (P);
a heat sealer (13) arranged along the main movement direction (M) and configured for receiving the evacuated semi-sealed packages (P), the heat sealer (13) comprising a heat sealing station (14) configured for heat sealing the terminal portion (TP) of each evacuated semi-sealed package (P) thereby forming heat sealed packages (P),
at least one pre-heating unit (39, 40) arranged along the main movement direction (M) upstream of the heat sealing station (14) and configured for pre-heating at least a band (TP2) of the terminal portion (TP) of each evacuated semi-sealed package (P),
wherein the heat sealer (13) comprises a sealing belt (18) configured for guiding the terminal portion (TP) of the evacuated semi-sealed packages (P) along the main movement direction (M) at least from the pre-heating unit (39, 40) to the heat sealing station (14), the pre-heating unit (39, 40) being configured for pre-heating at least a heat conveying tract of the sealing belt (18) designed to come into contact with said band (TP2) of the terminal portion (TP) of each evacuated semi-sealed package (P) and pre-heat it.

2. The packaging apparatus of claim 1, wherein the sealing belt (18) comprises, at least on a surface designed to come into contact with a heat sealing surface of the heat sealing station (14), non-stick material; the sealing belt (18) being configured for guiding the terminal portion (TP) of evacuated semi-sealed packages (P) along the main movement direction (M) at least at the heat sealing station (14) while avoiding that said terminal portion (TP) sticks to the heat sealing station (14).

3. The packaging apparatus of claim 1, wherein the pre-heating unit (39, 40) comprises a pre-heating body (42) arranged along the main movement direction (M) and facing or being at least partially in contact with the sealing belt (18), the pre-heating body (42) being configured for pre-heating said heat conveying tract of the sealing belt (18).

4. The packaging apparatus of claim 3, wherein the heat sealer (13) comprises a first pulley (20) and a second pulley (21) opposite to each other with respect to the heat sealing station (14), the first pulley (20) being arranged upstream the heat sealing station (14) with respect to the main movement direction (M) and being configured for guiding the sealing belt (18) towards the heat sealing station (14) and the second pulley (21) being configured for circulating back the sealing belt (18) towards the first pulley (20), the pre-heating body (39, 40) being arranged at or in proximity of the first pulley (20) and being configured for pre-heating said heat conveying tract of the sealing belt (18) in proximity of the first pulley (20).

5. The packaging apparatus of claim 3, wherein the pre-heating body (42) has at least one housing (43) and at least one heating cartridge (44) arranged in the housing (43), the heating cartridge (44) being configured for pre-heating said heat conveying tract of the sealing belt (18) upstream of the heat sealing station (14).

6. The packaging apparatus of claim 5, wherein the pre-heating body (42) comprises a first arm (42*a*), a second arm (42*b*) and a joining portion (42*c*) transversal to the first arm (42*a*) and the second arm (42*b*), the joining portion (42*c*) being arranged between, and joining, the first arm (42a) and the second arm (42b), said housing (43) and said heating cartridge (44) being located at the first arm (42a) and/or the second arm (42b), the sealing belt (18) facing or being in contact with the pre-heating body (42) at least at a portion of an outer surface of the pre-heating body (42) defined at the first and/or second arm (42a, 42b) comprising said housing (43) and said heating cartridge (44).

7. The packaging apparatus of claim 1, wherein the heat sealer (13) comprises at least one pulley (20, 21) configured for engaging the sealing belt (18), the pre-heating body (42) being configured for heating the at least one pulley (20, 21), the pre-heating body (42) being built-in in the pulley (20, 21) or being configured for conveying heat to the pulley (20, 21) or being separate from the at least one pulley (20, 21).

8. The packaging apparatus of claim 1, wherein the heat sealer (13) comprises a tensioning device (38) configured for tensioning the sealing belt (18).

9. A packaging apparatus (1) comprising:
a vacuum chamber (4) having an elongated opening (5) extending along or parallel to a longitudinal axis (L) of the vacuum chamber (4),
a conveyor (8) configured for receiving semi-sealed packages (P), each one of the semi-sealed packages (P) having a terminal portion (TP) with at least one opening and a main portion (MP) housing one or more products, the conveyor (8) being further configured for moving the semi-sealed packages (P) relative to the vacuum chamber (4) along a main movement direction (M) such that each semi-sealed package (P) positioned on the conveyor (8) may have, during the relative movement of the semi-sealed package (P) with respect to the vacuum chamber (4), the terminal portion (TP) passing through the elongated opening (5) with its opening relatively moving within the vacuum chamber (4), while the main portion (MP) relatively moves outside the vacuum chamber (4),
evacuation means (9) fluidly communicating with the vacuum chamber (4) and configured for providing the vacuum chamber (4) with an internal vacuum pressure that is lower than an ambient pressure outside the vacuum chamber (4) thereby evacuating gas present in the semi-sealed packages (P) and forming evacuated semi-sealed packages (P);
a heat sealer (13) arranged along the main movement direction (M) and configured for receiving the evacuated semi-sealed packages (P), the heat sealer (13) comprising a heat sealing station (14) configured for heat sealing the terminal portion (TP) of each evacuated semi-sealed package (P) thereby forming heat sealed packages (P),
at least one pre-heating unit (39, 40) arranged along the main movement direction (M) upstream of the heat sealing station (14) and configured for pre-heating at least a band (TP2) of the terminal portion (TP) of each evacuated semi-sealed package (P),
further comprising a control unit (47) communicatively connected at least with the pre-heating unit (39, 40), with the conveyor (8) and with the heat sealing station (14), the control unit (47) being configured for implementing a sealing procedure comprising:
setting or allowing setting of the pre-heating temperature and the heat sealing temperature,
controlling the conveyor (8) to guide at least the terminal portion (TP) of the semi-sealed packages (P) through the elongated opening (5) of the vacuum chamber (4) along or parallel to the longitudinal axis (L) of the vacuum chamber (4),
controlling the pre-heating unit (39, 40) based on said pre-heating temperature to pre-heat at least said band (TP2) of the terminal portion (TP) of each semi-sealed package (P) while the conveyor (8) moves the terminal portion (TP) of each semi-sealed package (P) along or parallel to the longitudinal axis (L) of the vacuum chamber (4),
controlling the heat sealing station (14) based on said heat sealing temperature to heat seal the terminal portion (TP) of each evacuated semi-sealed package (P) thereby forming heat sealed packages (P) while the conveyor (8) moves the terminal portion (TP) of the evacuated semi-sealed packages (P) along or parallel to the longitudinal axis (L) of the vacuum chamber (4),
optionally, the control unit (47) being communicatively connected also with the sealing belt (18) and being configured for controlling the sealing belt (18) in synchrony with the conveyor (8).

10. The packaging apparatus of claim 9, wherein the control unit (47) is configured for setting the pre-heating temperature as a function of at least one of:
an internal vacuum pressure defined in at least a portion of the vacuum chamber (4),
a temperature of the terminal portion (TP) of the evacuated semi-sealed packages (P) located upstream or at the pre-heating unit (39, 40),
a residual target pressure of the evacuated semi-sealed packages (P) or of the heat sealed packages (P),
the material of the semi-sealed packages (P) to be heat sealed,
at least one dimension of the semi-sealed packages (P), such as the thickness of the material (TP) of the semi-sealed package (P) at the terminal portion (TP) of the semi-sealed package (P), or of at least one dimension of the one or more products housed inside the semi-sealed packages (P).

11. The packaging apparatus of claim 9, further comprising a pre-heating temperature sensor (46), the control unit (47) being communicatively connected with the pre-heating temperature sensor (46) and being configured for implementing a pre-heating temperature monitoring procedure comprising:
detecting an actual temperature of the pre-heating unit (39, 40) or of the sealing belt (18),
comparing the detected actual temperature with the pre-heating temperature and determining a deviation between the detected actual temperature and the pre-heating temperature,
in case the deviation is greater than a prefixed threshold, controlling the pre-heating unit (39, 40) to reduce said deviation.

12. The packaging apparatus of claim 9, wherein the heat sealing station (14) comprises at least one heat sealing body (29) configured to act on the pre-heated band (TP2) of the terminal portion (TP) of each evacuated semi-sealed package (P), the heat sealing body (29) being configured for at least partially melting the pre-heated band (TP2) of the terminal portion (TP) of the evacuated semi-sealed packages (P) thereby forming heat sealed packages (P),
the control unit (47) being communicatively connected at least with the heat sealing body (29), wherein the sealing procedure further includes:

controlling the heat sealing body (29) to heat the terminal portion (TP) of each evacuated semi-sealed package (P) at the heat sealing temperature, at least partially melting, at the heat sealing temperature, the pre-heated band (TP2) of the terminal portion (TP) of the evacuated semi-sealed packages (P) thereby forming heat sealed packages (P) while the conveyor (8) moves the terminal portion (TP) of the evacuated semi-sealed packages (P) along or parallel to the longitudinal axis (L) of the vacuum chamber (4).

13. A packaging apparatus (1) comprising:
a vacuum chamber (4) having an elongated opening (5) extending along or parallel to a longitudinal axis (L) of the vacuum chamber (4),
a conveyor (8) configured for receiving semi-sealed packages (P), each one of the semi-sealed packages (P) having a terminal portion (TP) with at least one opening and a main portion (MP) housing one or more products, the conveyor (8) being further configured for moving the semi-sealed packages (P) relative to the vacuum chamber (4) along a main movement direction (M) such that each semi-sealed package (P) positioned on the conveyor (8) may have, during the relative movement of the semi-sealed package (P) with respect to the vacuum chamber (4), the terminal portion (TP) passing through the elongated opening (5) with its opening relatively moving within the vacuum chamber (4), while the main portion (MP) relatively moves outside the vacuum chamber (4),
evacuation means (9) fluidly communicating with the vacuum chamber (4) and configured for providing the vacuum chamber (4) with an internal vacuum pressure that is lower than an ambient pressure outside the vacuum chamber (4) thereby evacuating gas present in the semi-sealed packages (P) and forming evacuated semi-sealed packages (P);
a heat sealer (13) arranged along the main movement direction (M) and configured for receiving the evacuated semi-sealed packages (P), the heat sealer (13) comprising a heat sealing station (14) configured for heat sealing the terminal portion (TP) of each evacuated semi-sealed package (P) thereby forming heat sealed packages (P),
at least one pre-heating unit (39, 40) arranged along the main movement direction (M) upstream of the heat sealing station (14) and configured for pre-heating at least a band (TP2) of the terminal portion (TP) of each evacuated semi-sealed package (P),
further comprising a first pre-heating unit (39) and a second pre-heating unit (40) arranged opposite each other with respect to the elongated opening (5) of the vacuum chamber (4) and configured for receiving therebetween the terminal portion (TP) of each evacuated semi-sealed package (P), optionally the pre-heating body (42) of the first pre-heating unit (39) being configured for pre-heating a first surface of said band (TP2) of the terminal portion (TP) of the evacuated semi-sealed packages (P) and the pre-heating body (42) of the second pre-heating unit (40) being configured for pre-heating a second surface, opposite to the first surface, of said band (TP2) of the terminal portion (TP) of the evacuated semi-sealed packages (P).

14. A packaging process of semi-sealed packages (P) comprising the steps of:
providing a packaging apparatus (1) comprising:
a vacuum chamber (4) having an elongated opening (5) extending along or parallel to a longitudinal axis (L) of the vacuum chamber (4),
a conveyor (8) configured for receiving semi-sealed packages (P), each one of the semi-sealed packages (P) having a terminal portion (TP) with at least one opening and a main portion (MP) housing one or more products, the conveyor (8) being further configured for moving the semi-sealed packages (P) relative to the vacuum chamber (4) along a main movement direction (M) such that each semi-sealed package (P) positioned on the conveyor (8) may have, during the relative movement of the semi-sealed package (P) with respect to the vacuum chamber (4), the terminal portion (TP) passing through the elongated opening (5) with its opening relatively moving within the vacuum chamber (4), while the main portion (MP) relatively moves outside the vacuum chamber (4),
evacuation means (9) fluidly communicating with the vacuum chamber (4) and configured for providing the vacuum chamber (4) with an internal vacuum pressure that is lower than an ambient pressure outside the vacuum chamber (4) thereby evacuating gas present in the semi-sealed packages (P) and forming evacuated semi-sealed packages (P);
a heat sealer (13) arranged along the main movement direction (M) and configured for receiving the evacuated semi-sealed packages (P), the heat sealer (13) comprising a heat sealing station (14) configured for heat sealing the terminal portion (TP) of each evacuated semi-sealed package (P) thereby forming heat sealed packages (P),
at least one pre-heating unit (39, 40) arranged along the main movement direction (M) upstream of the heat sealing station (14) and configured for pre-heating at least a band (TP2) of the terminal portion (TP) of each evacuated semi-sealed package (P),
providing at least one semi-sealed package (P) having a terminal portion (TP) with at least one opening and a main portion (MP) housing one or more products,
moving the semi-sealed package (P) along the main movement direction (M), the step of moving the semi-sealed package (P) along the main movement direction (M) comprising:
introducing at least the terminal portion (TP) of the semi-sealed package (P) in the vacuum chamber (4) at the elongated opening (5),
moving at least the terminal portion (TP) of the semi-sealed package (P) inside the vacuum chamber (4) along or parallel to the elongated opening (5),
evacuating gas present in the semi-sealed package (P) and forming evacuated semi-sealed package (P) while moving the semi-sealed package (P) along the main movement direction (M),
heat sealing the terminal portion (TP) of the evacuated semi-sealed package (P),
before heat sealing the terminal portion (TP) of the evacuated semi-sealed package (P), pre-heating at least a band (TP2) of the terminal portion (TP) of each evacuated semi-sealed package (P),
wherein the step of pre-heating at least said band (TP2) of the terminal portion (TP) of each evacuated semi-sealed package (P) comprises:
pre-heating at least said heat conveying tract of a sealing belt (18) acting on the terminal portion (TP) of the evacuated semi-sealed packages (P), the sealing belt (18) optionally cooperating in guiding the terminal portion (TP) along the main movement direction (M), pre-heating said band (TP2) of the terminal portion (TP) of each evacuated semi-sealed package (P) by means of the heat conveying tract of the sealing belt (18).

* * * * *